(12) United States Patent
Negishi

(10) Patent No.: US 9,394,194 B2
(45) Date of Patent: Jul. 19, 2016

(54) OPTICAL GLASS AND USE THEREOF

(71) Applicant: Tomoaki Negishi, Tokyo (JP)

(72) Inventor: Tomoaki Negishi, Tokyo (JP)

(73) Assignee: HOYA CORPORATION, Tokyo (JP)

( * ) Notice: Subject to any disclaimer, the term of this patent is extended or adjusted under 35 U.S.C. 154(b) by 0 days.

(21) Appl. No.: 14/387,400

(22) PCT Filed: Mar. 15, 2013

(86) PCT No.: PCT/JP2013/057496
§ 371 (c)(1),
(2) Date: Sep. 23, 2014

(87) PCT Pub. No.: WO2013/146378
PCT Pub. Date: Oct. 3, 2013

(65) Prior Publication Data
US 2015/0031525 A1 Jan. 29, 2015

(30) Foreign Application Priority Data
Mar. 26, 2012 (JP) ................................. 2012-068696

(51) Int. Cl.
*C03C 3/068* (2006.01)
*C03C 3/095* (2006.01)
*C03C 3/155* (2006.01)

(52) U.S. Cl.
CPC ................. *C03C 3/068* (2013.01); *C03C 3/095* (2013.01); *C03C 3/155* (2013.01)

(58) Field of Classification Search
CPC .......... C03C 3/068; C03C 3/095; C03C 3/15; C03C 3/155
See application file for complete search history.

(56) References Cited

U.S. PATENT DOCUMENTS

| 4,584,279 | A | 4/1986 | Grabowski et al. |
| 8,127,570 | B2 | 3/2012 | Negishi et al. |
| 2009/0325779 | A1 | 12/2009 | Negishi et al. |
| 2011/0028300 | A1 | 2/2011 | Zou et al. |
| 2011/0263410 | A1 | 10/2011 | Negishi et al. |
| 2012/0142517 | A1 | 6/2012 | Negishi et al. |

FOREIGN PATENT DOCUMENTS

| JP | A-60-131845 | 7/1985 |
| JP | A-2010-30879 | 2/2010 |
| JP | A-2010-83705 | 4/2010 |
| WO | WO 2010/053214 A1 | 5/2010 |

OTHER PUBLICATIONS

International Preliminary Report on Patentability issued in PCT/JP2013/057496 issued Oct. 1, 2014 (with translation).
International Search Report issued in PCT/JP2013/057496 mailed Jun. 4, 2013 (with translation).
Sep. 29, 2015 Office Action issued in Japanese Patent Application No. 2014-507712.
Mar. 15, 2016 Office Action issued in Japanese Application No. 2014-507712.

*Primary Examiner* — Elizabeth A Bolden
(74) *Attorney, Agent, or Firm* — Oliff PLC

(57) ABSTRACT

An optical glass is oxide glass wherein $Si^{4+}+B^{3+}$ ranges from 10-60 cation %, $La^{3+}+Gd^{3+}+Y^{3+}+Yb^{3+}$ ranges from 25-70 cation %, $Ti^{4+}+Nb^{5+}+W^{6+}+Bi^{3+}$ ranges from 10-20 cation %, $Li^+$ content ranges from 0-5.0 cation %, Ge content is lower than 5.0 mass % as quantity of $GeO_2$ based on oxides, no Pb included, a cation ratio, $Si^{4+}/B^{3+}$, is equal or lower than 0.70, a cation ratio, $(La^{3+}+Gd^{3+}+Y^{3+}+Yb^{3+})/(Ti^{4+}+Nb^{5+}+W^{6+}+Bi^{3+})$, ranges from 1.90-7.00, a cation ratio, $Y^{3+}/(La^{3+}+Gd^{3+}+Y^{3+}+Yb^{3+})$, is equal or lower than 0.180, and $Nb^{5+}$ is an essential component, with $Ti^{4+}/Nb^{5+}$ being equal or lower than 4.00, with nd of higher than 1.920 and equal or lower than 2.000, vd ranging from 28.0-34.0, and yield point higher than 645° C., and a deviation ΔPg,F from normal line of partial dispersion ratio Pg,F being equal or lower than 0.0005.

16 Claims, 3 Drawing Sheets

OPTICAL GLASS AND USE THEREOF

CROSS-REFERENCE TO RELATED APPLICATIONS

This application claims the benefit of priority to Japanese Patent Application No. 2012-068696 filed on Mar. 26, 2012, which is expressly incorporated herein by reference in its entirety.

TECHNICAL FIELD

The present invention relates to optical glass with high refractive index and low dispersion characteristics, a press-molding glass gob, an optical element blank and an optical element, each of which is comprised of the above optical glass.

BACKGROUND ART

Lenses comprised of high refractive index and low dispersion glass permit compact optical systems with chromatic aberration correction when combined with lenses comprised of ultra-low dispersion glass. Thus, they occupy an extremely important position as optical elements constituting image pickup optical systems and projection optical systems such as projectors.

The optical glass (glass type TAFD25 (refractive index nd 1.90366, Abbé number vd 31.32)) made by Hoya Corp. that is described in OPTICAL GLASS Technical Data 2011 (released by Hoya Corp.) is an example of such high refractive index and low dispersion glass.

With the heightened specifications and high functionality of lenses in recent years, the importance of the partial dispersion characteristics of optical glasses that are lens materials has increased. Glasses that are particularly desirable for chromatic aberration correction have high refractive indexes and low dispersion, as well as being optical glass with low deviation $\Delta Pg,F$ (abnormal dispersion) from the normal line of the partial dispersion ratio Pg,F.

The above optical glass TAFD25 is an extremely good glass material because it is high refractive index and low dispersion glass with extremely low coloration. However, the $\Delta Pg,F$ is 0.0028; optical glass with lower $\Delta Pg,F$ would be desirable for the correction of high-order chromatic aberration.

High refractive index and low dispersion glass is also disclosed in Japanese Unexamined Patent Publication (KOKAI) Showa No. 60-131845 or English language family members U.S. Pat. No. 4,584,279 and US2011/0028300A1, Japanese Unexamined Patent Publication (KOKAI) No. 2010-083705 or English language family members US2012/0142517A1 and U.S. Pat. No. 8,127,570, which are expressly incorporated herein by reference in their entirety.

SUMMARY OF THE INVENTION

An aspect of the present invention provides for optical glass that has high refractive index and low dispersion characteristics as well as is suited to high-order chromatic aberration correction, and a press-molding glass gob, an optical element blank, and an optical element that are comprised of the above glass.

The present inventor conducted extensive research resulting in the discovery that by classifying glass components into glass network-forming components ($Si^{4+}$, $B^{3+}$); high refractive index, low dispersion components serving to raise the refractive index while maintaining low dispersion ($La^{3+}$, $Gd^{3+}$, $Y^{3+}$, and $Yb^{3+}$); and high refractive index, high dispersion components that serve to raise the refractive index and dispersion ($Ti^{4+}$, $Nb^{5+}$, $W^{6+}$, and $Bi^{3+}$); roughly distributing the content of network-forming components, the content of high refractive index, low dispersion components, and the content of high refractive index, high dispersion components so as to obtain good glass stability while having a desired refractive index and Abbé number; and adjusting the ratio of the content of high refractive index, low dispersion components and the content of high refractive index, high dispersion components, as well as adjusting the overall composition, it was possible to obtain optical glass that was suited to high-order chromatic aberration correction while having a high refractive index and low dispersion.

An aspect of the present invention relates to optical glass, which is oxide glass wherein:

a total content of $Si^{4+}$ and $B^{3+}$ ranges from 10 to 60 cation %;

a total content of $La^{3+}$, $Gd^{3+}$, $Y^{3+}$, and $Yb^{3+}$ ranges from 25 to 70 cation %;

a total content of $Ti^{4+}$, $Nb^{5+}$, $W^{6+}$, and $Bi^{3+}$ ranges from 10 to 20 cation %;

a content of Lf ranges from 0 to 5.0 cation %;

a content of Ge is lower than 5.0 mass % as a quantity of $GeO_2$ in a glass composition based on oxides;

no Pb is comprised;

a cation ratio of a content of $Si^{4+}$ to a content of $B^{3+}$, $Si^{4+}/B^{3+}$, is equal to or lower than 0.70;

a cation ratio of the total content of $La^{3+}$, $Gd^{3+}$, $Y^{3+}$, and $Yb^{3+}$ to the total content of $Ti^{4+}$, $Nb^{5+}$, $W^{6+}$, and $Bi^{3+}$, $(La^{3+}+Gd^{3+}+Y^{3+}+Yb^{3+})/(Ti^{4+}+Nb^{5+}+W^{6+}+Bi^{3+})$, ranges from 1.90 to 7.00;

a cation ratio of a content of $Y^{3+}$ to the total content $La^{3+}$, $Gd^{3+}$, $Y^{3+}$, and $Yb^{3+}$, $Y^{3+}/(La^{3+}Gd^{3+}+Y^{3+}+Yb^{3+})$, is equal to or lower than 0.180; and $Nb^{5+}$ is comprised as an essential component, with a cation ratio of a content of $Ti^{4+}$ to a content of $Nb^{5+}$, $Ti^{4+}/Nb^{5+}$, being equal to or lower than 4.00;

which has a refractive index nd within a range of higher than 1.920 and equal to or lower than 2.000, an Abbé number vd ranging from 28.0 to 34.0, and a yield point of higher than 645° C.; and wherein a deviation $\Delta Pg,F$ from a normal line of a partial dispersion ratio Pg,F obtained from the following equation is equal to or lower than 0.0005:

$$\Delta Pg,F = Pg,F + (0.0018 \times vd) - 0.6483$$

wherein, in the equation, Pg,F denotes a partial dispersion ratio given by $(ng-nF)/(nF-nC)$ using various refractive indexes ng, nF, and nC at spectral lines g, F, and c; and vd denotes the Abbé number.

In an embodiment, the content of Yb in the above optical glass is lower than 2 mass % as a quantity of $Yb_2O_3$ in the glass composition based on oxides.

In an embodiment, in the above optical glass, the cation ratio of the total content of $La^{3+}$, $Gd^{3+}$, $Y^{3+}$, and $Yb^{3+}$ to a total content of $Si^{4+}$ and $B^{3+}$, $(La^{3+}+Gd^{3+}+Y^{3+}+Yb^{3+})/(Si^{4+}B^{3+})$, is equal to or higher than 0.83, or the cation ratio of the total content of $Ti^{4+}$, $Nb^{5+}$, $W^{6+}$, and $Bi^{3+}$ to the total content of $Si^{4+}$ and $B^{3+}$, $(Ti^{4+}+Nb^{5+}+W^{6+}+Bi^{3+})/(Si^{4+}+B^{3+})$, is equal to or higher than 0.31.

In an embodiment, the total content of $Ti^{4+}$, $Nb^{5+}$, $W^{6+}$, $Bi^{3+}$, and $Ta^{5+}$ in the above optical glass ranges from 13 to 30 cation %.

In an embodiment, in the above optical glass, the content of $Si^{4+}$ ranges from 1.0 to 30 cation %, the content of $B^{3+}$ ranges from 5 to 55 cation %, and the content of $La^{3+}$ ranges from 10 to 50 cation %.

In an embodiment, the content of $Zr^{4+}$ in the above optical glass ranges from 1 to 15 cation %.

In an embodiment, the content of $Zn^{2+}$ in the above optical glass ranges from 0 to 15 cation %.

In an embodiment, the above optical glass has a glass transition temperature of higher than 630° C.

In an embodiment, the total content of $Gd^{3+}$, $Y^{3+}$, and $Yb^{3+}$ in the above optical glass ranges from 0.5 to 35 cation %.

A further aspect of the present invention relates to optical glass, which is oxide glass wherein, denoted as cation %:

a total content of $Si^{4+}$ and $B^{3+}$ ranges from 10 to 60%;

a total content of $La^{3+}$, $Gd^{3+}$, $Y^{3+}$, and $Yb^{3+}$ ranges from 25 to 70%;

a total content of $Ti^{4+}$, $Nb^{5+}$, $W^{6+}$, and $Bi^{3+}$ ranges from 10 to 20%;

a cation ratio of the total content of $La^{3+}$, $Gd^{3+}$, $Y^{3+}$, and $Yb^{3+}$ to the total content of $Ti^{4+}$, $Nb^{5+}$, $W^{6+}$, and $Bi^{3+}$, $(La^{3+}+Gd^{3+}+Y^{3+}+Yb^{3+})/(Ti^{4+}+Nb^{5+}+W^{6+}+Bi^{3+})$, ranges from 1.90 to 7.00;

which has a refractive index nd ranging from 1.88 to 2.00 and an Abbé number vd ranging from 28.0 to 34.0; and wherein a deviation $\Delta Pg,F$ from a normal line of a partial dispersion ratio Pg,F obtained from the following equation is equal to or lower than 0.0005:

$$\Delta Pg,F = Pg,F + (0.0018 \times vd) - 0.6483$$

wherein, in the equation, Pg,F denotes a partial dispersion ratio given by (ng−nF)/(nF−nC) using various refractive indexes ng, nF, and nC at spectral lines g, F, and c; and vd denotes the Abbé number.

A further aspect of the present invention relates to a press-molding glass gob comprised of the above optical glass.

A further aspect of the present invention relates to an optical element blank comprised of the above optical glass.

A further aspect of the present invention relates to an optical element comprised of the above optical glass.

An aspect of the present invention can provides optical glass suited to high-order chromatic aberration correction while affording high refractive index and low dispersion characteristics, and a press-molding glass gob, an optical element blank, and an optical element comprised of the above glass.

OPTICAL GLASS

Figure 1:
FIG. 1 is a digital camera photograph showing poor glass stability of optical glass with a cation ratio of $(Y^{3+}/(La^{3+}+Gd^{3+}+Y^{3+}+Yb^{3+}))$ exceeding 0.180.

An aspect of the present invention relates to optical glass, which is oxide glass wherein:

a total content of $Si^{4+}$ and $B^{3+}$ ranges from 10 to 60 cation %;

a total content of $La^{3+}$, $Gd^{3+}$, $Y^{3+}$, and $Yb^{3+}$ ranges from 25 to 70 cation %;

a total content of $Ti^{4+}$, $Nb^{5+}$, $W^{6+}$, and $Bi^{3+}$ ranges from 10 to 20 cation %;

a content of $Li^+$ ranges from 0 to 5.0 cation %;

a content of Ge is lower than 5.0 mass % as a quantity of $GeO_2$ in a glass composition based on oxides;

no Pb is comprised;

a cation ratio of a content of $Si^{4+}$ to a content of $B^{3+}$, $Si^{4+}/B^{3+}$, is equal to or lower than 0.70;

a cation ratio of the total content of $La^{3+}$, $Gd^{3+}$, $Y^{3+}$, and $Yb^{3+}$ to the total content of $Ti^{4+}$, $Nb^{5+}$, $W^{6+}$, and $Bi^{3+}$, $(La^{3+}+Gd^{3+}+Y^{3+}+Yb^{3+})/(Ti^{4+}+Nb^{5+}+W^{6+}+Bi^{3+})$, ranges from 1.90 to 7.00;

a cation ratio of a content of $Y^{3+}$ to the total content $La^{3+}$, $Gd^{3+}$, $Y^{3+}$, and $Yb^{3+}$, $Y^{3+}/(La^{3+}+Gd^{3+}+Y^{3+}+Yb^{3+})$, is equal to or lower than 0.180; and $Nb^{5+}$ is comprised as an essential component, with a cation ratio of a content of $Ti^{4+}$ to a content of $Nb^{5+}$, $Ti^{4+}/Nb^{5+}$, being equal to or lower than 4.00;

which has a refractive index nd within a range of higher than 1.920 and equal to or lower than 2.000, an Abbé number vd ranging from 28.0 to 34.0, and a yield point of higher than 645° C.; and wherein a deviation $\Delta Pg,F$ from a normal line of a partial dispersion ratio Pg,F obtained from the following equation is equal to or lower than 0.0005:

$$\Delta Pg,F = Pg,F + (0.0018 \times vd) - 0.6483$$

wherein, in the equation, Pg,F denotes a partial dispersion ratio given by (ng−nF)/(nF−nC) using various refractive indexes ng, nF, and nC at spectral lines g, F, and c; and vd denotes the Abbé number.

The reasons for specifying the above composition ranges will be described below. Unless specifically stated otherwise, the contents and total contents of the various components are given as cation %.

Both $Si^{4+}$ and $B^{3+}$ are glass network-forming components that are effective for maintaining glass stability. When the total content of $Si^{4+}$ and $B^{3+}$ is less than 10%, glass stability deteriorates and the liquidus temperature rises. When the total content exceeds 60%, it becomes difficult to achieve the desired refractive index. Accordingly, the total content of $Si^+$ and $B^{3+}$ is set to 10 to 60%. More specifically, it can be set to 10.0 to 60.0%. the upper limit of the total content of $Si^{4+}$ and $B^{3+}$ is desirably 50%, more specifically 50.0%; preferably 45%, more specifically 45.0%; more preferably 43%, more specifically 43.0%; still more preferably 42%, more specifically 42.0%; and yet more preferably 41%, more specifically 41.0%. The lower limit of the total content of $Si^{4+}$ and $B^{3+}$ is desirably 15%, more specifically 15.0%; preferably 20%, more specifically 20.0%; more preferably 25%, more specifically 25.0%; still more preferably 30%, more specifically 30.0%; and yet more preferably, 35%, more specifically 35.0%.

To inhibit a rise in the liquidus temperature and an excessive rise in the glass transition temperature, and to maintain meltability and resistance to devitrification, the cation ratio of the content of $Si^{4+}$ to the content of $B^{3+}$($Si^{4+}/B^{3+}$) is equal to or lower than 0.70. It is desirably equal to or lower than 0.65, preferably equal to or lower than 0.6, more preferably equal to or lower than 0.5, still more preferably equal to or lower than 0.45, yet more preferably equal to or lower than 0.4, and yet still more preferably, equal to or lower than 0.35.

From the perspectives of improving the thermal stability of the glass, achieving a viscosity suited to molding of the glass melt, and improving chemical durability, the cation ratio of $(Si^{4+}/B^{3+})$ is desirably equal to or higher than 0.05, preferably equal to or higher than 0.1.

$La^{3+}$, $Gd^{3+}$, $Y^{3+}$, and $Yb^{3+}$ are high refractive index, low dispersion components that serve to enhance chemical durability, lower $\Delta Pg,F$, and improve coloration of the glass. At a total content of $La^{3+}$, $Gd^{3+}$, $Y^{3+}$, and $Yb^{3+}$ of less than 25%, the above effects are not achieved, and it becomes difficult to achieve the desired refractive index and Abbé number. Additionally, when the total content of $La^{3+}$, $Gd^{3+}$, $Y^{3+}$, and $Yb^{3+}$ exceeds 70%, glass stability deteriorates and the liquidus temperature rises. Accordingly, the total content of $La^{3+}$, $Gd^{3+}$, $Y^{3+}$, and $Yb^{3+}$ is set to 25 to 70%, more specifically, 25.0 to 70.0%. The upper limit of the total content of $La^{3+}$, $Y^{3+}$, and $Yb^{3+}$ is desirably 60%, more specifically 60.0%; preferably 55%, more specifically 55.0%; more preferably 50%, more specifically 50.0%; still more preferably 45%, more specifically 45.0%; yet more preferably 40%, more specifically 40.0%, and yet still more preferably, 38%, more specifically 38.0%. The lower limit of the total content of $La^{3+}$, $Gd^{3+}$, $Y^{3+}$, and $Yb^{3+}$ is desirably 28%, more specifically 28.0%; preferably 30%, more specifically 30.0%; more preferably 31%, more specifically 31.0%; still more preferably 32%, more specifically 32.0%; yet more preferably 33%, more specifically 33.0%; and yet still more preferably 34%, more specifically 34.0%.

$Ti^{4+}$, $Nb^{5+}$, $W^{6+}$, and $Bi^{3+}$ are high refractive index, high dispersion components that raise the refractive index and lower the Abbé number. They also serve to enhance resistance to devitrification, inhibit a rise in the liquidus temperature, and enhance chemical durability. When the total content of $Ti^{4+}$, $Nb^{5+}$, $W^{6+}$, and $Bi^{3+}$ is less than 10%, the above effects are not obtained. When the total content of $Ti^{4+}$, $Nb^{5+}$, $W^{6+}$, and $Bi^{3+}$ exceeds 20%, dispersion becomes excessive, $\Delta Pg,F$ increases, and glass coloration intensifies. Accordingly, the total content of $Ti^{4+}$, $Nb^{5+}$, $W^{6+}$, and $Bi^{3+}$ is set to 10 to 20%, more specifically, 10.0 to 20.0%. The upper limit of the total content of $Ti^{4+}$, $Nb^{5+}$, $W^{6+}$, and $Bi^{3+}$ is desirably 19.5%; preferably 19%, more specifically 19.0%; more preferably 18.5%; still more preferably 18%, more specifically 18.0%; and yet more preferably 17.5%. The lower limit of the total content of $Ti^{4+}$, $Nb^{5+}$, $W^{6+}$, and $Bi^{3+}$ is desirably 11%, more specifically 11.0%; preferably 12%, more specifically 12.0%; more preferably 13%, more specifically 13.0%; still more preferably 13.5%; yet more preferably 14%, more specifically 14.0%; and yet still more preferably 14.5%.

To obtain a desired optical glass, in addition to specifying the total content of $La^{3+}$, $Gd^{3+}$, $Y^{3+}$, and $Yb^{3+}(La^{3+}+Gd^{3+}+Y^{3+}+Yb^{3+})$ and the total content of $Ti^{4+}$, $Nb^{5+}$, $W^{6+}$, and $Bi^{3+}(Ti^{4+}+Nb^{5+}+W^{6+}+Bi)$ in to the ranges set forth above, the cation ratio of the total content of $La^{3+}$, $Gd^{3+}$, $Y^{3+}$, and $Yb^{3+}$ to the total content of $Ti^{4+}$, $Nb^{5+}$, $W^{6+}$, and $Bi^{3+}$, $(La^{3+}+Gd^{3+}+Y^{3+}+Yb^{3+})/(Ti^{4+}+Nb^{5+}+W^{6+}+Bi)$, is set to within a prescribed range. When the cation ratio, $(La^{3+}+Gd^{3+}+Y^{3+}+Yb^{3+})/(Ti^{4+}+Nb^{5+}+W^{6+}+Bi)$, is less than 1.90, $\Delta Pg,F$ increases, resistance to devitrification deteriorates, and coloration of the glass intensifies. On the other hand, when the above cation ratio exceeds 7.00, resistance to devitrification deteriorates and the liquidus temperature rises. According, the cation ratio, $(La^{3+}+Gd^{3+}+Y^{3+}+Yb^{3+})/(Ti^{4+}+Nb^{5+}+W^{6+}+Bi)$, is set to a range of 1.90 to 7.00. The upper limit of the cation ratio, $(La^{3+}+Gd^{3+}+Y^{3+}+Yb^{3+})/(Ti^{4+}+Nb^{5+}+W^{6+}+Bi)$, is desirably 6.00, preferably 5.00, more preferably 4.00, still more preferably 3.00, and yet more preferably 2.85. The lower limit of the above cation ratio is desirably 1.95, preferably 1.98, more preferably 2.00, still more preferably 2.03, yet more preferably 2.05, and yet still more preferably, 2.10.

To maintain the thermal stability and resistance to devitrification of the glass and inhibit a rise in the liquidus temperature, the cation ratio of the content of $Y^{3+}$ to the total content of $La^{3+}$, $Gd^{3+}$, $Y^{3+}$, and $Yb^{3+}$, $Y^{3+}/(La^{3+}+Gd^{3+}+Y^{3+}+Yb^{3+})$, is set to equal to or lower than 0.180.

From the above perspectives, the cation ratio, $Y^{3+}/(La^{3+}+Gd^{3+}+Y^{3+}+Yb^{3+})$, is desirably equal to or lower than 0.150, preferably equal to or lower than 0.130, and more preferably, equal to or lower than 0.100.

The cation ratio, $Y^{3+}/(La^{3+}+Gd^{3+}+Y^{3+}+Yb^{3+})$, can also be made 0. The incorporation of a small quantity of $Y^{3+}$ can lower the liquidus temperature and improve resistance to devitrification. Thus, the cation ratio, $Y^{3+}/(La^{3+}+Gd^{3+}+Y^{3+}+Yb^{3+})$, is desirably equal to or higher than 0.020.

The glass characteristics of the optical glass according to an aspect of the present invention will be described next.

To impart functionality and achieve compactness in glass optical elements and in optical systems in which the above glass optical elements have been assembled, it is effective to employ optical glass with a refractive index nd of higher than 1.920. Additionally, when the refractive index nd is higher than 2.000, the stability of the glass tends to decrease. Thus, to provide an optical element material that can effectively impart functionality and compactness to an optical system while maintaining the stability of the glass, the range of the refractive index nd is set to higher than 1.920 and equal to or lower than 2.000. The upper limit of the refractive index nd is desirably 1.980, preferably 1.970, more preferably 1.960, and still more preferably 1.955. The lower limit of the refractive index nd is desirably 1.925, preferably 1.930, more preferably 1.940, and still more preferably 1.945. In addition, there are cases where it is desirable that the lower limit of the refractive index is equal to or higher than 1.88, equal to or higher than 1.90, or equal to or higher than 1.92.

In the optical glass according to an aspect of the present invention, to provide an optical element material that is suited to chromatic aberration correction by utilizing low dispersion, the lower limit of the Abbé number vd is set to 28.0. To maintain or enhance the stability of the glass, the upper limit of the Abbé number vd is set to 34.0. That is, the range of the Abbé number vd is 28.0 to 34.0. The upper limit of the Abbé number vd is desirably 33.5, preferably 33.0. The lower limit of the Abbé number vd is desirably 29.0, preferably 30.0, more preferably 30.5, still more preferably 31.0, yet more preferably 31.5, and yet still more preferably, 32.0.

In the optical glass according to an aspect of the present invention, the yield point is higher than 645° C. The cold processing property of the glass relates to the yield point, although indirectly. Glasses with low yield points are better suited to precision press molding than to cold processing. In contrast, glasses with high yield points are better suited to cold processing than to precision press molding; they have good cold processing properties. Accordingly, in the optical glass according to an aspect of the present invention, as well, the yield point is kept not being excessively low, and is set to higher than 645° C. The yield point is desirably equal to or higher than 660° C., preferably equal to or higher than 680° C., more preferably equal to or higher than 700° C., still more preferably equal to or higher than 720° C., and yet more preferably, equal to or higher than 740° C. When the yield point is excessively high, the heating temperature rises during reheating, softening, and molding of the glass, deterioration of the mold employed in molding becomes marked, the annealing temperature rises, and the annealing furnace deteriorates and undergoes marked wear and tear. Accordingly, the yield point is desirably equal to or lower than 850° C.

In the optical glass according to an aspect the present invention, the refractive index nd is higher than 1.920 and equal to or lower than 2.000, the Abbé number vd ranges from 30.0 to 34.0, and the ΔPg,F is low. Such optical glass is suitable as an optical element material for high-order chromatic aberration correction.

In this context, the partial dispersion ratio Pg,F is denoted as (ng−nF)/(nF−nC) with the various refractive indexes ng, nF, and nC at the g spectral line, F spectral line, and c spectral line, respectively. In the present invention, ng, nF, and nC are values obtained by the method given in Examples further below.

In the present invention, ΔPg,F is set to equal to or lower than 0.0005 to provide optical glass that is suited to high-order chromatic aberration correction.

In the figure showing a plot of the partial dispersion ratio Pg,F against the Abbé number vd, when the partial dispersion ratio on the normal line that serves as a reference for normal partial dispersion glass is denoted as Pg,F(0), Pg,F(0) is denoted by the following equation using the Abbé number vd.

$$Pg, F(0) = 0.6483 - (0.018 \times vd)$$

ΔPg,F is the deviation in the partial dispersion ratio Pg,F from the normal line, and is expressed by the following equation.

$$\Delta Pg, F = Pg, F - Pg, F(0)$$
$$= Pg, F + (0.0018 \times vd) - 0.6483$$

To provide optical glass that is suitable as an optical element material for high-order chromatic aberration correction, ΔPg,F desirably ranges from equal to or lower than 0.0004, preferably equal to or lower than 0.0003, more preferably equal to or lower than 0.0002, still more preferably equal to or lower than 0.0001, and yet more preferably, is equal to or lower than 0.0000.

When comparing $Ti^{4+}$ and $Nb^{5+}$, the ΔPg,F increasing effect of $Nb^{5+}$ is less than that of $Ti^{4+}$. Accordingly, to lower ΔPg,F, in a glass composition containing an essential component in the form of $Nb^{5+}$, the cation ratio of the $Ti^{4+}$ content to the $Nb^{5+}$ content, $Ti^{4+}/Nb^{5+}$, is set to equal to or lower than 4.00. To further lower ΔPg,F, the cation ratio, $Ti^{4+}/Nb^{5+}$, is desirably equal to or lower than 3.50, preferably equal to or lower than 3.00, more preferably equal to or lower than 2.50, and still more preferably, equal to or lower than 2.00. To improve resistance to devitrification and inhibit a rise in the liquidus temperature, the cation ratio, $Ti^{4+}/Nb^{5+}$, is desirably equal to or higher than 0.05, preferably equal to or higher than 0.1, more preferably equal to or higher than 0.15, and still more preferably, equal to or higher than 0.2.

In general, in the high refractive index region, as the Abbé number decreases, ΔPg,F tends to increase. Additionally, to correct high-order chromatic aberration, high refractive index glass with a low ΔPg,F is desirable. However, when the Abbé number vd is in the range of equal to or lower than 34.0, reducing the ΔPg,F to equal to or lower than 0.0005 has conventionally been difficult. In an aspect of the present invention, as a specific desirable embodiment for adjusting the composition to achieve a ΔPg,F of equal to or lower than 0.0005 with an Abbé number vd in a range of equal to or lower than 34.0, either one or both of the following can be satisfied:

the cation ratio of the total content of $La^{3+}$, $Gd^{3+}$, $Y^{3+}$, and $Yb^{3+}$ to the total content of $Si^{4+}$ and $B^{3+}$, $(La^{3+}+Gd^{3+}+Y^{3+}+Yb^{3+})/(Si^{4+}+B^{3+})$, is equal to or higher than 0.83; and the cation ratio of the total content of $Ti^{4+}$, $Nb^{5+}$, $W^{6+}$, and $Bi^{3+}$ to the total content of $Si^{4+}$ and $B^{3+}$, $(Ti^{4+}+Nb^{5+}+W^{6+}+Bi^{3+})/(Si^{4+}+B^{3+})$, ranges from equal to or higher than 0.31.

The lower limit of the cation ratio, $(La^{3+}+Gd^{3+}+Y^{3+}+Yb^{3+})/(Si^{4+}+B^{3+})$, is desirably 0.84, preferably 0.85, and more preferably, 0.86.

The lower limit of the cation ratio, $(Ti^{4+}+Nb^{5+}+W^{6+}+Bi^{3+})/(Si^{4+}+B^{3+})$, is desirably 0.34, preferably 0.35, more preferably 0.36, still more preferably 0.37, yet more preferably 0.38, and yet still more preferably, 0.39.

The upper limit of the cation ratio, $(La^{3+}+Gd^{3+}+Y^{3+}+Yb^{3+})/(Si^{4+}+B^{3+})$, is determined based on the glass composition that is required by the optical glass according to an aspect of the present invention. For example, it can be equal to or lower than 2.0. To maintain the thermal stability of the glass, the upper limit of the cation ratio, $(La^{3+}+Gd^{3+}+Y^{3+}+Yb^{3+})/(Si^{4+}+B^{3+})$, is desirably 1.6, preferably 1.4, more preferably 1.2, still more preferably 1.0, and yet more preferably, 0.98.

The upper limit of the cation ratio, $(Ti^{4+}+Nb^{5+}+W^{6+}+Bi^{3+})/(Si^{4+}+B^{3+})$, is also determined based on the glass composition required by the optical glass according to an aspect of the present invention. For example, it can be equal to or lower than 1.5. To maintain the thermal stability of the glass, the upper limit of the cation ratio of, $(Ti^{4+}+Nb^{5+}+W^{6+}+Bi^{3+})/(Si^{4+}+B^{3+})$, is desirably 1.2, preferably 1.0, more preferably 0.8, still more preferably 0.7, yet more preferably 0.6, and yet still more preferably 0.5, $Li^+$ serves to strongly lower the glass transition temperature in particular, even among the alkali metal components. Thus, when the content of $Li^+$ is excessive, the glass transition temperature drops and the processing property during grinding and polishing decreases. Accordingly, the $Li^+$ content is desirably determined so that the glass transition temperature does not drop. From the perspective, the $Li^+$ content is set to fall within the range of 0 to 5.0%. The desirable range of the $Li^+$ content is set forth further below.

Ge is a glass network-forming component. It serves to raise the refractive index, and is thus a component that can raise the refractive index while maintaining glass stability. However, compared to other components, it is a significantly more expensive component and the content thereof is desirably reduced. In the optical glass according to an aspect of the present invention, by means of the composition adjustment set forth above and further below, even when the Ge content is kept to less than 5.0 mass % as the quantity of $GeO_2$ in the glass composition based on oxides, it is possible to achieve both the desired optical characteristics and good glass stability. The quantity of $GeO_2$ is desirably 0 to 4 mass %, more specifically 0 to 4.0 mass %; preferably 0 to 3 mass %, more specifically 0 to 3.0 mass %; more preferably 0 to 2 mass %, more specifically 0 to 2.0 mass %; still more preferably 0 to 1 mass %, more specifically 0 to 1.0 mass %; and yet more preferably, 0 mass %. That is, a Ge-free glass is particularly desirable. The term "glass composition based on oxides" refers to the glass composition obtained by conversion of the glass starting materials by fully decomposing during melting so as to be present in the form of oxides in the optical glass.

A preferable embodiment of the optical glass according to an aspect of the present invention will be described next.

$Si^{4+}$ is a glass network-forming component, as set forth above, that is effective for maintaining the stability of the glass, maintaining a viscosity suited to molding of the glass melt, and improving chemical durability. To heighten these effects, the $Si^{4+}$ content is desirably equal to or higher than 1%; preferably equal to or higher than 3%, more specifically equal to or higher than 3.0%; more preferably equal to or higher than 4%, more specifically equal to or higher than 4.0%; still more preferably equal to or higher than 5%, more specifically equal to or higher than 5.0%; yet more preferably equal to or higher than 6%, more specifically equal to or higher than 6.0%; yet still more preferably equal to or higher than 7%, more specifically equal to or higher than 7.0%; and even more preferably equal to or higher than 8%, more specifically equal to or higher than 8.0%. To achieve a desired refractive index and Abbé number, inhibit a rise in the liquidus temperature and glass transition temperature, and maintain resistance to devitrification and meltability, the $Si^{4+}$ content is desirably equal to or lower than 30%, specifically equal to or lower than 30.0%; preferably equal to or lower than 25%, specifically equal to or lower than 25.0%; more preferably equal to or lower than 20%, specifically equal to or lower than 20.0%; still more preferably equal to or lower than 18%, specifically equal to or lower than 18.0%; yet more preferably equal to or lower than 15%, specifically equal to or lower than 15.0%; yet still more preferably equal to or lower than 12%, specifically equal to or lower than 12.0%; and even more preferably equal to or lower than 11%, specifically equal to or lower than 11.0%.

As set forth above, $B^{3+}$ is a glass network-forming component, and an essential component that effectively maintains the meltability of the glass, lowers the liquidus temperature, increases glass stability, and lowers dispersion. To heighten these effects, the content of $B^{3+}$ is desirably equal to or higher than 5%; preferably equal to or higher than 10%, specifically equal to or higher than 10.0%; more preferably equal to or higher than 15%, specifically equal to or higher than 15.0%; still more preferably equal to or higher than 20%, specifically equal to or higher than 20.0%; yet more preferably equal to or higher than 25%, specifically equal to or higher than 25.0%; yet still more preferably equal to or higher than 28%, specifically equal to or higher than 28.0%. To achieve a desired refractive index and maintain chemical durability, the $B^{3+}$ content is desirably equal to or lower than 55%, specifically equal to or lower than 55.0%; preferably equal to or lower than 45%, specifically equal to or lower than 45.0%; more preferably equal to or lower than 40%, specifically equal to or lower than 40.0%; still more preferably equal to or lower than 38%, specifically equal to or lower than 38.0%; yet more preferably equal to or lower than 35%, specifically equal to or lower than 35.0%; and yet still more preferably, equal to or lower than 33%, specifically equal to or lower than 33.0%.

$La^{3+}$ is a component that effectively serves to raise the refractive index and lower dispersion while maintaining glass stability. It also serves to lower the $\Delta Pg,F$. To heighten these effects, the $La^{3+}$ content is desirably equal to or higher than 10%, specifically equal to or higher than 10.0%; preferably equal to or higher than 15%, specifically equal to or higher than 15.0%; more preferably equal to or higher than 18%, specifically equal to or higher than 18.0%; still more preferably equal to or higher than 20%, specifically equal to or higher than 20.0%; yet more preferably equal to or higher than 22%, specifically equal to or higher than 22.0%; yet still more preferably equal to or higher than 24%, specifically equal to or higher than 24.0%; even more preferably equal to or higher than 26%, specifically equal to or higher than 26.0%. To maintain resistance to devitrification and inhibit a rise in the liquidus temperature, the $La^{3+}$ content is desirably equal to or lower than 50%, specifically equal to or lower than 50.0%; preferably equal to or lower than 45%, specifically equal to or lower than 45.0%; more preferably equal to or lower than 40%, specifically equal to or lower than 40.0%; more preferably equal to or lower than 35%, specifically equal to or lower than 35.0%; still more preferably equal to or lower than 33%, specifically equal to or lower than 33.0%; yet more preferably equal to or lower than 32%, specifically equal to or lower than 32.0%; and yet still more preferably, equal to or lower than 31%, specifically equal to or lower than 31.0%.

Each of $Gd^{3+}$, $Y^{3+}$, and $Yb^{3+}$ lowers the liquidus temperature and serves to greatly increase resistance to devitrification when in the presence of $La^{3+}$. They also serve to lower $\Delta Pg,F$. To heighten these effects, the total content of $Gd^{3+}$, $Y^{3+}$, and $Yb^{3+}$ is desirably equal to or higher than 0.5%; preferably equal to or higher than 1%, specifically equal to or higher than 1.0%; more preferably equal to or higher than 2%, specifically equal to or higher than 2.0%; still more preferably equal to or higher than 3%, specifically equal to or higher than 3.0%; yet more preferably equal to or higher than 4%; yet still more preferably equal to or higher than 5%; even more preferably equal to or higher than 5.5%. To maintain resistance to devitrification and inhibit a rise in the liquidus temperature, the total content of $Gd^{3+}$, $Y^{3+}$, and $Yb^{3+}$ is desirably equal to or lower than 35%, specifically equal to or lower than 35.0%; preferably equal to or lower than 30%, specifically equal to or lower than 30.0%; more preferably equal to or lower than 25%, specifically equal to or lower than 25.0%; still more preferably equal to or lower than 20%, specifically equal to or lower than 20.0%; yet more preferably equal to or lower than 15%, specifically equal to or lower than 15.0%; yet still more preferably equal to or lower than 10%, specifically equal to or lower than 10.0%; and even more preferably, equal to or lower than 7%, specifically equal to or lower than 7.0%.

To lower the liquidus temperature and improve resistance to devitrification, the $Gd^{3+}$ content desirably ranges from 0 to 20%, specifically within a range of 0 to 20.0%. The upper limit of the $Gd^{3+}$ content is desirably 15%, specifically 15.0%; preferably 13%, specifically 13.0%; more preferably 11%, specifically 11.0%; still more preferably 9%, specifically 9.0%; and yet more preferably 7%, specifically 7.0%. The lower limit of the $Gd^{3+}$ content is desirably 0.5%; preferably 1%, specifically 1.0%; more preferably 2%, specifically 2.0%; still more preferably 3%, specifically 3.0%; and yet more preferably 4%, specifically 4.0%. The $Gd^{3+}$ content can be 0%.

To lower the liquidus temperature and improve resistance to devitrification, the $Y^{3+}$ content desirably ranges from 0 to 15%, specifically within a range of 0 to 15.0%. The upper limit of the $Y^{3+}$ content is desirably 10%, specifically 10.0%; preferably 7%, specifically 7.0%; more preferably 5%, specifically 5.0%; still more preferably 3%, specifically 3.0%; and yet more preferably 2%, specifically 2.0%. The lower limit of the $Y^{3+}$ content is desirably 0.1%. The $Y^{3+}$ content can be 0%.

To lower the liquidus temperature and improve resistance to devitrification, the $Yb^{3+}$ content desirably ranges from 0 to 10%, specifically 0 to 10.0%; preferably within a range of 0 to 6%, specifically 0 to 6.0%; more preferably within a range of 0 to 4%, specifically 0 to 4.0%; still more preferably within a range of 0 to 2%, specifically 0 to 2.0%. The $Yb^{3+}$ content can be 0%. Since $Yb^{3+}$ absorbs light in the infrared region, it is unsuited to use in high sensitivity optical systems that are required to have photosensitive characteristics in the near infrared region, such as high-precision video cameras and monitoring cameras. Glasses with reduced $Yb^{3+}$ content are suited to these applications. The quantity of $Yb_2O_3$ in the glass composition based on oxides is desirably less than 2 mass %, preferably equal to or lower than 1.8 mass %, more preferably equal to or lower than 1.5 mass %, still more preferably equal to or lower than 1.2 mass %, yet more preferably equal to or lower than 1.0 mass %, yet still more preferably, in order of increasing preference, equal to or lower than 0.9 mass %, equal to or lower than 0.8 mass %, equal to or lower than 0.7 mass %, equal to or lower than 0.6 mass %, equal to or lower than 0.5 mass %, equal to or lower than 0.3 mass %, equal to or lower than 0.1 mass %, and 0 mass %.

As set forth above, $Ti^{4+}$, $Nb^{5+}$, $W^{6+}$, and $Bi^{3+}$ serve to raise the refractive index, lower the Abbé number, improve resistance to devitrification, inhibit a rise in the liquidus temperature, and improve chemical durability. $Ta^{5+}$ can also perform the same functions. To heighten these effects, the total content of $Ti^{4+}$, $Nb^{5+}$, $Ta^{5+}$, $W^{6+}$, and $Bi^{3+}$ is desirably equal to or higher than 13%, specifically equal to or higher than 13.0%; preferably equal to or higher than 13.5%; more preferably equal to or higher than 14%, specifically equal to or higher than 14.0%; still more preferably equal to or higher than 14.5%. To maintain resistance to devitrification while maintaining the Abbé number within a desired range, inhibit a rise in the liquidus temperature, and improve coloration of the glass, the total content of $Ti^{4+}$, $Nb^{5+}$, $Ta^{5+}$, $W^{6+}$, and $Bi^{3+}$ is desirably equal to or lower than 30%, specifically equal to or lower than 30.0%; preferably equal to or lower than 28%, specifically equal to or lower than 28.0%; more preferably equal to or lower than 26%, specifically equal to or lower than 26.0%; still more preferably equal to or lower than 24%, specifically equal to or lower than 24.0%; yet more preferably equal to or lower than 22%, specifically equal to or lower than 22.0%; yet still more preferably equal to or lower than 20%, specifically equal to or lower than 20.0%; and even more preferably, equal to or lower than 17.5%.

In addition to the above effects, $Ti^{4+}$ has the effect of increasing $\Delta Pg,F$. Accordingly, the upper limit of the $Ti^{4+}$ content is desirably 18%, specifically 18.0%; preferably 17%, specifically 17.0%; more preferably 16%, specifically 16.0%; still more preferably 15%, specifically 15.0%; yet more preferably 14%, specifically 14.0%; yet still more preferably 13%, specifically 13.0%; and even more preferably 12%, specifically 12.0%. $Ti^{4+}$ effectively improves resistance to devitrification even among high refractive index, high dispersion components, and has a good effect in inhibiting a rise in the liquidus temperature. Accordingly, the lower limit of the $Ti^{4+}$ content is desirably 1%, specifically 1.0%; preferably 2%, specifically 2.0%; more preferably 3%, specifically 3.0%; still more preferably 4%, specifically 4.0%; yet more preferably 5%, specifically 5.0%; yet still more preferably 6%, specifically 6.0%; and even more preferably 7%, specifically 7.0%.

In addition to the above effects, $Nb^{5+}$ has the effect of increasing $\Delta Pg,F$. However, it tends to increase $\Delta Pg,F$ less than $Ti^{4+}$ and $W^{6+}$. Accordingly, the upper limit of the $Nb^{5+}$ content is desirably 30%, specifically 30.0%; preferably 25%, specifically 25.0%; more preferably 20%, specifically 20.0%; still more preferably 15%, specifically 15.0%; yet more preferably 10%, specifically 10.0%; and yet still more preferably 8%, specifically 8.0%. Even among the high refractive index, high dispersion components, $Nb^{5+}$ has good effects in improving resistance to devitrification and inhibiting a rise in the liquidus temperature. Accordingly, the lower limit of the $Nb^{5+}$ content is desirably 0.5%; preferably 1%, specifically 1.0%; more preferably 2%, specifically 2.0%; still more preferably 3%, specifically 3.0%; yet more preferably 4%, specifically 4.0%; and yet more preferably 5%, specifically 5.0%.

In addition to the above effects, $Ta^{5+}$ has the effect of increasing $\Delta Pg,F$. However, it tends to increase $\Delta Pg,F$ less than $Ti^{4+}$, $W^{6+}$, and $Nb^{5+}$. Accordingly, the $Ta^{5+}$ content desirably ranges from 0 to 10%, specifically 0 to 10.0%; preferably ranges from 0 to 8%, specifically 0 to 8.0%; more preferably ranges from 0 to 6%, specifically 0 to 6.0%; still more preferably ranges from 0 to 4%, specifically 0 to 4.0%; and yet more preferably ranges from 0 to 2%, specifically 0 to 2.0%. The $Ta^{5+}$ content can be 0%.

Although $Ta^{5+}$ tends not to increase $\Delta Pg,F$ as much as $Ti^{4+}$, $Nb^{5+}$, $W^{6+}$, and $Bi^{3+}$, it is a scarce raw material and expensive. Accordingly, to stably supply optical glass, it is desirable to reduce the $Ta^{5+}$ content. From this perspective, the cation ratio of the $Ta^{5+}$ content to the total content of $Ti^{4+}$, $Nb^{5+}$, $Ta^{5+}$, $W^{6+}$, and $Bi^{3+}$, $Ta^{5+}/(Ti^{4+}+Nb^{5+}+Ta^{5+}+W^{6+}+Bi^{3+}$, is desirably equal to or lower than 0.45, preferably equal to or lower than 0.40, more preferably equal to or lower than 0.30; still more preferably equal to or lower than 0.20; yet more preferably equal to or lower than 0.10; and yet still more preferably, 0.00.

In addition to the above effects, $W^{6+}$ has the effect of increasing $\Delta Pg,F$. Accordingly, the $W^{6+}$ content desirably ranges from 0 to 10%, specifically 0 to 10.0%; more preferably ranges from 0 to 7%, specifically 0 to 7.0%; still more preferably ranges from 0 to 5%, specifically 0 to 5.0%; yet more preferably ranges from 0 to 3%, specifically 0 to 3.0%; yet still more preferably ranges from 0 to 2%, specifically 0 to 2.0%. The $W^{6+}$ content can be 0%. The quantity of $WO_3$ in the glass composition based on oxides is desirably less than 10 mass %, preferably less than 9 mass %, more preferably equal to or lower than 8 mass %, still more preferably equal to or lower than 7 mass %, and yet more preferably, 0 mass %.

In addition to the above effects, $Bi^{3+}$ has the effect of increasing $\Delta Pg,F$. Since the glass starting materials for incorporating $Bi^{3+}$ sometimes contain large amounts of rare earth components, glass coloration sometimes increases in glasses with high melting temperatures. Accordingly, the $Bi^{3+}$ content desirably ranges from 0 to 10%, specifically 0 to 10.0%; preferably ranges from 0 to 6%, specifically 0 to 6.0%; more preferably ranges from 0 to 4%, specifically 0 to 4.0%; still more preferably ranges from 0 to 2%, specifically 0 to 2.0%; yet more preferably ranges from 0 to 1%, specifically 0 to 1.0%. The $Bi^{3+}$ content can be 0%.

$Zr^{4+}$ functions to raise the refractive index and to enhance chemical durability. When present with $Ti^{4+}$, it functions to enhance resistance to devitrification and inhibit a rise in the liquidus temperature. To achieve these effects, the $Zr^{4+}$ content is desirably equal to or higher than 1%. From the perspectives of inhibiting raising the glass transition temperature and liquidus temperature as well as a decrease in resistance to devitrification, the upper limit of the $Zr^{4+}$ content is desirably 15%, specifically 15.0%. The upper limit of the $Zr^{4+}$ content is preferably 10%, specifically 10.0%; more preferably 8%, specifically 8.0%; still more preferably 7%, specifically 7.0%. The lower limit of the $Zr^{4+}$ content is desirably 2%, specifically 2.0%; preferably 3%, specifically 3.0%; and more preferably 4%, specifically 4.0%.

$Zn^{2+}$ functions to lower the refractive index and glass stability, but improves the meltability and clarifying property of the glass. However, the refractive index decreases and the stability of the glass tends to decrease when an excessive quantity is incorporated. Thus, the $Zn^{2+}$ content desirably ranges from 0 to 15%, specifically 0 to 15.0%. The $Zn^{2+}$ content is preferably equal to or lower than 12%, specifically equal to or lower than 12.0%; more preferably equal to or lower than 10%, specifically equal to or lower than 10.0%; still more preferably equal to or lower than 8%, specifically equal to or lower than 8.0%; yet more preferably equal to or lower than 6%, specifically equal to or lower than 6.0%; yet still more preferably less than 6.0%; even more preferably equal to or lower than 5.5%; even still more preferably equal to or lower than 5%, specifically equal to or lower than 5.0%; and even yet more preferably, equal to or lower than 4.5%. Each of the oxides of $Si^{4+}$, $La^{3+}$, $Gd^{3+}$, $Y^{3+}$, $Yb^{3+}$, $Ti^{4+}$, $Nb^{5+}$, $Ta^{5+}$, $W^{6+}$, and $Zr^{4+}$ that are contained as essential or optional components has an extremely high melting point and functions to compromise meltability and clarifying property. Thus, it is desirable to incorporate $Zn^{2+}$, which has the effect of enhancing the meltability and clarifying property. The lower limit of the $Zn^{2+}$ content is desirably 0.1%; preferably 0.5%; more preferably 0.8%; still more preferably 1%, specifically 1.0%; yet more preferably 1.5%; and yet still more preferably 2%, specifically 2.0%.

From the perspective of obtaining a high refractive index glass, the total content of $La^{3+}$, $Gd^{3+}$, $Y^{3+}$, $Yb^{3+}$, $Ti^{4+}$, $Nb^{5+}$, $Zr^{4+}$, $Ta^{5+}$, and $W^{6+}$ is desirably equal to or higher than 50%, equal to or higher than preferably 51%, more preferably equal to or higher than 52%, still more preferably equal to or higher than 53%, yet more preferably equal to or higher than 54%, and yet still more preferably, equal to or higher than 55%.

$Li^+$, $Na^+$, and $K^+$ are optional components that function to enhance meltability and lower the glass transition temperature. From the perspective of raising the liquidus temperature and inhibiting a drop in glass stability and chemical durability while achieving a high refractive index, the total content of $Li^+$, $Na^+$, and $K^+$ desirably ranges from 0 to 10%, specifically within a range of 0 to 10.0%. The total content of $Li^+$, $Na^+$, and $K^+$ preferably ranges from 0 to 8%, specifically 0 to 8.0%; more preferably ranges from 0 to 6%, specifically 0 to 6.0%; still more preferably ranges from 0 to 4%, specifically 0 to 4.0%; yet more preferably ranges from 0 to 2%, specifically 0 to 2.0%; yet still more preferably ranges from 0 to 1%, specifically 0 to 1.0%; and even more preferably, none of the above alkali metal components are contained.

The content of each of content $Li^+$, $Na^+$, and $K^+$ desirably ranges from 0 to 10%, specifically 0 to 10.0%; preferably within a range of 0 to 7%, specifically 0 to 7.0%; more preferably within a range of 0 to 5%, specifically 0 to 5.0%; still more preferably within a range of 0 to 4%, specifically 0 to 4.0%; yet more preferably within a range of 0 to 3%, specifically 0 to 3.0%; yet still more specifically within a range of 0 to 2%, specifically 0 to 2.0%; even more preferably within a range of 0 to 1%, specifically 0 to 1.0%; and even still more preferably, none of the above alkali metal components is contained.

$Mg^{2+}$, $Ca^{2+}$, $Sr^{2+}$, and $Ba^{2+}$ function to improve the meltability of the glass and lower the glass transition temperature Tg. Their introduction in the form of nitrates and sulfates into glass can have a defoaming effect. As the total quantity of $Mg^{2+}$, $Ca^{2+}$, $Sr^{2+}$, and $Ba^{2+}$ increases, the liquidus temperature tends to rise and the resistance to devitrification, refractive index, and chemical durability all tend to drop. To inhibit a rise in the liquidus temperature and maintain resistance to devitrification, the refractive index, and chemical durability, the total content of $Mg^{2+}$, $Ca^{2+}$, $Sr^{2+}$, and $Ba^{2+}$ is desirably 0 to 10%, specifically 0 to 10.0%. The total content of $Mg^{2+}$, $Ca^{2+}$, $Sr^{2+}$, and $Ba^{2+}$ preferably ranges from 0 to 8%, specifically 0 to 8.0%; more preferably ranges from 0 to 6%, specifically 0 to 6.0%; still more preferably ranges from 0 to 4%, specifically 0 to 4.0%; yet more preferably ranges from 0 to 2%, specifically 0 to 2.0%; yet still more preferably ranges from 0 to 1%, specifically 0 to 1.0%; and even more preferably, none of the above alkaline earth metal components is contained.

The content of each of components $Mg^{2+}$, $Ca^{2+}$, $Sr^{2+}$, and $Ba^{2+}$ desirably ranges from 0 to 10%, specifically 0 to 10.0%; preferably within a range of 0 to 7%, specifically 0 to 7.0%; more preferably within a range of 0 to 5%, specifically 0 to 5.0%; still more preferably within a range of 0 to 3%, specifically 0 to 3.0%; yet more preferably within a range of 0 to 2%, specifically 0 to 2.0%; yet still more specifically within a range of 0 to 1%, specifically 0 to 1.0%; even more preferably, none of each of the above alkaline earth metal components is contained.

$Ge^{4+}$ is a glass network-forming component that serves to raise the refractive index. It is thus a component that can raise the refractive index while maintaining glass stability. It is much more expensive than the other components, so the content thereof is desirably limited. In the optical glass according to an aspect of the present invention, since the composition is established as set forth above, even when the content of $Ge^{4+}$ is kept to equal to or lower than 10% for example, it is possible to achieve both desired optical characteristics and good glass stability. Accordingly, the content of $Ge^{4+}$ is desirably 0 to 10%, specifically 0 to 10.0%. The content of $Ge^{4+}$ preferably ranges from 0 to 8%, specifically 0 to 8.0%; more preferably ranges from 0 to 6%, specifically 0 to 6.0%; still more preferably ranges from 0 to 4%, specifically 0 to 4.0%; and in order of increasing preference, ranges from 0 to 3.5%; 0 to 3%, specifically 0 to 3.0%; 0 to 2.5%; 0 to 2%, specifically 0 to 2.0%; 0 to 1.5%, and 0 to 0.5%. It is even more preferable for no $Ge^{4+}$ to be contained, that is, for the glass to be free of Ge.

$Al^{3+}$ functions to improve glass stability and chemical durability in small quantities. However, in quantities exceeding 10%, the liquidus temperature rises and the resistance to devitrification tends to deteriorate. Accordingly, the content of $Al^{3+}$ is desirably 0 to 10%, specifically 0 to 10.0%. The content of $Al^{3+}$ preferably ranges from 0 to 8%, specifically 0 to 8.0%; more preferably ranges from 0 to 6%, specifically 0 to 6.0%; still more preferably ranges from 0 to 4%, specifically 0 to 4.0%; yet more preferably ranges from 0 to 2%, specifically 0 to 2.0%; yet still more preferably ranges from 0 to 1%, specifically 0 to 1.0%; and even more preferably, no $Al^{3+}$ is contained.

$Te^{4+}$ serves to raise the refractive index. However, taking into account the burden on the environment, the content thereof is desirably 0 to 10%, specifically 0 to 10.0%. The content of $Te^{4+}$ preferably ranges from 0 to 8%, specifically 0 to 8.0%; more preferably ranges from 0 to 6%, specifically 0 to 6.0%; still more preferably ranges from 0 to 4%, specifically 0 to 4.0%; yet more preferably ranges from 0 to 2%, specifically 0 to 2.0%; yet still more preferably ranges from 0 to 1%, specifically 0 to 1.0%; and in increasing order of preference, is less than 0.5%, less than 0.3%, and less than 0.1%. Even more desirably, no $Te^{4+}$ is contained, that is, the glass is free of Te.

To obtain a desired optical glass, the content of optional cation components other than the above cation components is desirably kept to 0 to 5%; preferably 0 to 4%, specifically 0 to 4.0%; more preferably to 0 to 3%, more specifically 0 to 3.0%; still more preferably to 0 to 2.5%; yet more preferably to 0 to 2%, specifically 0 to 2.0%; yet still more preferably to 0 to 1.5%; even more preferably to 0 to 1%, specifically 0 to 1.0%; and even still more preferably, to 0 to 0.5%. The content of optional cation components other than the above cation components can be 0%.

The optical glass according to an aspect of the present invention maintains glass stability while achieving desired optical characteristics. Thus, components such as Lu, Hf, Ga, In, and Sc need not be incorporated. Since Lu, Hf, Ga, In, and Sc are expensive components, the content of each of $Lu^{3+}$, $Hf^{4+}$, $Ga^{3+}$, $In^{3+}$, and $Sc^{3+}$ is desirably kept to 0 to 1.0%, preferably to 0 to 0.5%. It is particularly desirable not to incorporate any $Lu^{3+}$, not to incorporate any $He^+$, not to incorporate any $Ga^{3+}$, not to incorporate any $In^{3+}$, and not to incorporate any $Sc^{3+}$.

Sb can be added as a clarifying agent. In small quantities, it serves to inhibit a drop in light transmittance due to the mixing in of impurities such as Fe. When converted to an oxide in the form of $Sb_2O_3$ and added in a proportion relative to the total quantity other than $Sb_2O_3$ exceeding 1 mass %, the glass develops color, and due to a powerful oxidizing effect, deterioration of the molding surface in the mold ends up being promoted. Accordingly, the quantity of Sb added as converted to $Sb_2O_3$ is desirably 0 to 1 mass %, preferably 0 to 0.5 mass %, and more preferably, 0 to 0.1 mass % as a proportion relative to the total quantity other than $Sb_2O_3$.

Sn can also be added as a clarifying agent. When converted to an oxide in the form of $SnO_2$ and added in a proportion relative to the total quantity other than $SnO_2$ exceeding 1 mass %, the glass develops color; due to a powerful oxidizing effect, deterioration of the molding surface in the mold ends up being promoted. Accordingly, the quantity of Sn added as converted to $SnO_2$ is desirably 0 to 1 mass %, preferably 0 to 0.5 mass % as a proportion relative to the total quantity other than $SnO_2$.

In addition to the above, small quantities of Ce oxide, sulfate, nitrate, chloride, and fluoride can be added as clarifying agents.

Taking into account the impact on the environment, it is desirable not to incorporate As, Pb, U, Th, or Cd. In particular, taking into account the impact on the environment, no Pb is contained in the optical glass according to an aspect of the present invention.

To utilize the good light transparence of the glass, it is desirable not to incorporate substances that cause coloration, such as Cu, Cr, V, Fe, Ni, Co, Nd, and Tb.

In the present specification and the present invention, the terms "not incorporate," "does not contain," and "the content of a constituent component is 0%" means that the constituent component is not incorporated as a glass component. However, unintentional mixing in as an impurity is permissible.

The optical glass according to an aspect of the present invention is oxide glass. The main anion component is $O^{2-}$. It is possible to add small quantities of $Cl^-$ and $F^-$ as clarifying agents as set forth above. However, to provide an optical glass having a high refractive index, low dispersion, and good glass stability, the content of $O^{2-}$ is desirably equal to or higher than 98 anion %, preferably equal to or higher than 99 anion %, more preferably equal to or higher than 99.5 anion %, and still more preferably, 100 anion %.

(Liquidus Temperature)

High refractive index glass will contain large amounts of high refractive index components (such as $La^{3+}$ ($La_2O_3$), $Gd^{3+}$ ($Gd_2O_3$), $Y^{3+}$ ($Y_2O_3$), $Yb^{3+}$ ($Yb_2O_3$), $Ti^{4+}$ ($TiO_2$), $Nb^{5+}$ ($Nb_2O_5$), $Ta^{5+}$ ($Ta_2O_5$), $W^{6+}$ ($WO_3$), and $Zr^{4+}$ ($ZrO_2$)). All of these components have extremely high melting points on their own. When the total quantity of high refractive index components is large, the total quantity of components serving to lower the melting temperature, such as alkali metal components and alkaline earth metal components, decreases in relative fashion. The meltability and resistance to devitrification decrease, requiring that the melting temperature for obtaining a homogeneous glass be raised.

When the melting temperature rises, the corrosiveness of the glass melt intensifies, the melt vessel is corroded, materials constituting the vessel, such as platinum and platinum alloys, leach out into the glass melt, causing coloration and resulting in platinum foreign matter. When the melting temperature is high, volatile components such as $B^{3+}$ volatize, the composition of the glass changes over time, and there is a problem in the form of fluctuation in glass characteristics.

To resolve such problems, it suffices to inhibit a rise in the melting temperature. The range of the melting temperature can be thought of as the temperature range at which a homogeneous glass melt can be obtained. The lower limit of the temperature range can be thought of as changing in a manner linked to any rise or fall of the liquidus temperature. Accordingly, it would be possible to inhibit a rise in the melting temperature by inhibiting a rise in the liquidus temperature.

Were it possible to inhibit a rise in the liquidus temperature, it would effectively prevent devitrification during glass molding, it would be possible to adjust the viscosity of the glass to within a range suited to molding, and it would be easy to manufacture molded glass articles of high quality.

For these reasons, a desirable embodiment of the optical glass according to an aspect of the present invention has a liquidus temperature of equal to or lower than 1,400° C. The upper limit of the liquidus temperature is desirably 1,350° C., preferably 1,300° C., more preferably 1,280° C., still more preferably 1,270° C., yet more preferably 1,260° C., and yet still more preferably, 1,200° C. However, when the liquidus temperature is excessively low, it becomes difficult to maintain desired optical characteristics. Thus, it suffices to set the lower limit of the liquidus temperature within a range permitting the stable manufacturing of glass. From such a perspective, the lower limit of the liquidus temperature is desirably 1,100° C., preferably 1,150° C., more preferably 1,160° C., still more preferably 1,170° C., and yet more preferably, 1,180° C.

(Specific Gravity)

The optical glass according to an aspect of the present invention is high refractive index glass. Generally, increasing the refractive index of glass tends to increase the specific gravity. However, increasing the specific gravity is undesirable in that it invites an increase in the weight of optical elements. By contrast, the optical glass according to an aspect of the present invention has the above composition, and as a result, despite being high refractive index glass, can have a specific gravity of equal to or lower than 6.00. However, when the specific gravity is excessively reduced, the stability of the glass diminishes and the liquidus temperature tends to rise. Thus, the specific gravity is desirably equal to or higher than 4.00. The upper limit of the specific gravity is preferably 5.50, more preferably 5.30, still more preferably 5.20, and yet more preferably 5.15. The lower limit of the specific gravity is desirably 4.30, preferably 4.50, more preferably 4.80, and still more preferably, 4.90.

(Transmittance Characteristics)

The transmittance characteristics of the optical glass according to an aspect of the present invention will be described next.

The optical glass according to an aspect of the present invention can exhibit high light transmittance over a broad wavelength range in the visible range. A desirable embodiment of the optical glass according to an aspect of the present invention exhibits a degree of coloration in the form of λ70 of equal to or lower than 500 nm. The λ70 preferably ranges of equal to or lower than 480 nm, more preferably within a range of equal to or lower than 460 nm, still more preferably within a range of equal to or lower than 440 nm, yet more preferably within a range of equal to or lower than 430 nm. The lower limit of λ70 is not specifically limited. When the quantity of high refractive index, high dispersion compounds is excessively reduced to lower λ70, it becomes difficult to maintain the refractive index, Abbé number, and resistance to devitrification. Thus, λ70 is desirably not excessively diminished.

From this perspective, the lower limit of λ70 is desirably 360 nm, preferably 370 nm, more preferably 380 nm, still more preferably 390 nm, and yet more preferably, 400 nm.

In this context, "λ70" is the wavelength at which light transmittance in the wavelength range of 280 to 700 nm becomes 70%. The light transmittance is the light transmittance that is obtained when light enters the polished surface from a perpendicular direction using a glass sample having mutually parallel surfaces that have been polished to a thickness of 10.0±0.1 mm, that is, Iout/Iin when the intensity of the light entering the sample is denoted as En and the intensity of the light passing through the sample as Tout. The spectral transmittance includes reflection losses of light on the sample surface. The above polishing means that the surface roughness has been smoothed to a highly fine state for wavelengths of the measurement wavelength range. In the optical glass according to an aspect of the present invention, in the visible range on the longer wavelength side than λ70, it is desirable for the light transmittance to exceed 70%.

The λ5 is the wavelength at which light transmittance as measured by the method used for λ70 becomes 5%. λ5 desirably ranges from equal to or lower than 400 nm, preferably falls within a wavelength of equal to or lower than 390 nm, more preferably falls within a wavelength of equal to or lower than 380 nm, still more preferably falls within a wavelength of equal to or lower than 370 nm, and yet more preferably falls within a wavelength of equal to or lower than 360 nm. The same things can be applied to the lower limit of λ5 as of the lower limit of λ70. The lower limit of λ5 is desirably 300 nm, preferably 320 nm, more preferably 330 nm, still more preferably 340 nm, and yet still more preferably 350 nm.

The spectral transmittance is measured over a wavelength range of 280 to 700 nm, as set forth above. Normally, the light transmittance increases when moving in the direction of increasing wavelength from λ5. When λ70 is reached, a high transmittance of equal to or higher than 70% is maintained up to a wavelength of 700 nm.

(Glass Transition Temperature)

The optical glass according to an aspect of the present invention is suited to the forming of smooth, optically functional surfaces by polishing. There is a relation, although indirect, between suitability to cold processing such as polishing, that is, cold processing property, and the glass transition temperature. Glass with a low glass transition temperature will be better suited to precision press molding than to cold processing. However, glass with a high glass transition temperature will be better suited to cold processing than to precision press molding and will afford good cold processing property. Accordingly, in the optical glass according to an aspect of the present invention, it is desirable for the glass transition temperature not to be excessively low. The glass transition temperature is desirably higher than 630° C., is preferably equal to or higher than 640° C., is more preferably equal to or higher than 650° C., is still more preferably equal to or higher than 660° C., is yet more preferably equal to or higher than 670° C., is yet still more preferably equal to or higher than 680° C., and is even more preferably equal to or higher than 690° C.

However, when the glass transition temperature is excessively high, the heating temperature becomes higher when reheating and softening for molding, deterioration of the mold used for molding becomes marked, the annealing temperature rises, and deterioration and wear and tear of the annealing furnace become pronounced. Accordingly, the glass transition temperature is desirably equal to or lower than 850° C., preferably equal to or lower than 800° C., and more preferably, equal to or lower than 750° C.

The optical glass according to an aspect of the present invention can be manufactured by blending glass starting materials so as to obtain the optical glass according to an aspect of the present invention, heating the glass starting materials to melt them, and molding the glass melt that is obtained.

For example, powder compound starting materials or cullet starting materials are weighed out and blended in a manner corresponding to the target glass composition, this mixture is fed into a melting vessel of platinum or a platinum alloy, and the mixture is heated and melted. Once the starting materials have been fully melted and vitrified, the temperature of the glass melt is raised to conduct clarification. The clarified glass melt is stirred with a stirrer and homogenized, continuously fed to a glass outflow pipe, caused to flow out, quickly cooled, and solidified to obtain a molded glass article.

Keeping the melting temperature of the optical glass to within a range of 1,250 to 1,500° C. is desirable to obtain homogeneous glass with little coloration and with various stable characteristics such as optical characteristics.

As the optical glass according to a further aspect, the following optical glass is also provided:

the optical glass, which is oxide glass and comprises, denoted as cation %:

a total of 10.0 to 60.0% of $Si^{4+}$ and $B^{3+}$;

a total of 25.0 to 70.0% of $La^{3+}$, $Gd^{3+}$, $Y^{3+}$, and $Yb^{3+}$;

a total of 10.0 to 20.0% of $Ti^{4+}$, $Nb^{5+}$, $W^{6+}$, and $Bi^{3+}$;

wherein the cation ratio of the total content of $La^{3+}$, $Gd^{3+}$, $Y^{3+}$, and $Yb^{3+}$ to the total content of $Ti^{4+}$, $Nb^{5+}$, $W^{6+}$, and $Bi^{3+}$, $(La^{3+}+Gd^{3+}+Y^{3+}+Yb^{3+})/(Ti^{4+}+Nb^{5+}+W^{6+}+Bi^{3+})$, is 1.90 to 7.00;

which has a refractive index nd ranging from 1.88 to 2.00, an Abbé number νd ranging from 28.0 to 34.0; and wherein a deviation ΔPg,F from a normal line of a partial dispersion ratio Pg,F obtained from the following equation is equal to or lower than 0.0005:

$$\Delta Pg,F = Pg,F + (0.0018 \times vd) - 0.6483$$

wherein, in the equation, Pg,F denotes a partial dispersion ratio given by (ng−nF)/(nF−nC) using various refractive indexes ng, nF, and nC at spectral lines g, F, and c; and νd denotes the Abbé number. For details, reference can be made to the description of the optical glass according to an aspect of the present invention set forth above.

[Press-molding Glass Gob]

The press-molding glass gob according to an aspect of the present invention is comprised of the optical glass according to an aspect of the present invention set forth above. The shape of the gob is desirably a shape that can be easily press molded based on the shape of the desired article to be press molded. The mass of the gob is also desirably set in conformity to the article to be press molded. Since glass of good stability can be employed in the present invention, the glass tends not to devitrify during reheating, softening, or even press molding, making it possible to stably produce high-quality molded articles.

Examples of manufacturing the press-molding glass gob are given below.

In the first manufacturing example, a glass melt flowing out of a pipe is continuously cast into a casting mold that is disposed horizontally beneath an outflow pipe, and molded into a sheet-like shape of a certain thickness. The molded glass is continuously drawn in a horizontal direction from an opening provided in the lateral surface of the casting mold. Drawing of the sheet-like glass molded article is accomplished with a conveyor belt. The drawing rate of the conveyor belt is set constant and drawing is conducted so that the plate thickness of the molded glass article remains constant. Thus, a molded glass article of prescribed thickness and sheet width can be obtained. The molded glass article is conveyed by the belt conveyor to the interior of an annealing furnace, where it is gradually cooled. The gradually cooled molded glass article is cut or severed in the direction of plate thickness, subjected to grinding, and barrel polished to obtain a press-molding glass gob.

In the second manufacturing example, a glass melt is cast into a cylindrical casting mold instead of the above casting mold, and a cylindrical molded glass article is molded. The molded glass article that is molded in the casting mold is drawn perpendicularly downward at a constant rate from an opening in the bottom of the casting mold. It suffices for the drawing rate to be determined so that the level of the glass melt remains constant within the casting mold. After gradually cooling the molded glass article, it is cut or severed, and subjected polishing processing or barrel polishing to obtain a press-molding glass gob.

In the third manufacturing example, a molding machine in which multiple molds are disposed at regular spacing on the outer perimeter of a round turntable is positioned beneath an outflow pipe. The turntable is index rotated. One of the positions at which the molds stop is adopted as the position for feeding the glass melt to the mold (called the casting position), and the glass melt is fed to this position. The glass melt that has been fed is molded into a molded glass article, after which the molded glass article is removed when at a prescribed position (takeout position) where the mold stops that is different from the casting position. It suffices to determine which stopping position to make the takeout position by taking into account the speed at which the turntable rotates, the cooling rate of the glass, and the like. The glass melt can be fed to the mold at the casting position by the method of dripping glass melt from the glass outflow opening of the outflow pipe and receiving the glass drop on the mold; by the method of having the mold that stops at the casting position approach the glass outflow opening and support the lower end of the glass melt flow that is flowing out, forming a constriction part way down the glass flow, and at a prescribed timing, lowering the mold perpendicularly downward to separate the glass melt at the constriction and receive it on the mold; the method of cutting the glass melt flow that flows out with a shear and receiving the separated glass melt gob with a mold that stops at the casting position; and the like.

It suffices to use a known method of molding the glass on the mold. Among these methods, when gas is blown upward from the mold to apply upward air pressure on the glass gob and molding is conducted while floating the glass, it is possible to prevent wrinkles from forming on the surface of the molded glass article and the generation of cracks in the molded glass article due to contact with the mold.

The shape of the molded glass article can be rendered spherical, spheroidal, a shape having one axis of rotational symmetry, a shape with two surfaces that are both outwardly convex facing the axial direction of the axis of rotation, and the like by selecting the shape of the mold or by how the above gas is blown. These shapes are suitable for glass gobs for press molding optical element blanks or optical elements such as lenses. The molded glass article that is thus obtained can be employed as a press-molding glass gob as is or after being surface polished or barrel polished.

[Optical Element Blank]

The optical element blank according to an aspect of the present invention will be described next.

The optical element blank according to an aspect of the present invention is comprised of the optical glass according to an aspect of the present invention set forth above. The optical element blank according to an aspect of the present invention is suitable as a glass base material for preparing optical elements having various properties provided by the optical glass according to an aspect of the present invention set forth above.

The optical element blank is a molded glass article having a shape resembling the shape of the optical element with a processing allowance added for removal by grinding and polishing to the shape of the targeted optical element, The first embodiment of the method of manufacturing an optical element blank set forth above is a method of manufacturing an optical element blank that is to be finished into an optical element by grinding and polishing, in which the press-molding glass gob according to an aspect of the present invention is softened by heating and press molded. This method is also referred to as the reheating press molding method.

The second embodiment of the method of manufacturing an optical element blank is a method of manufacturing an optical element blank that is to be finished into an optical element by grinding and polishing, in which the glass starting materials are melted by heating and the glass melt obtained is press molded to prepare the optical element blank according to an aspect of the present invention. This method is also referred to as the direct press molding method.

In the above first embodiment, a pressing mold having a molding surface with a shape resembling the reverse of the surface shape of a targeted optical element is prepared. The pressing mold is comprised of an upper mold, a lower mold, and as needed, a mold part comprising a barrel mold.

Next, the press-molding glass gob is softened by heating, placed in a preheated lower mold, the lower mold is pressed against an opposing upper mold, and the glass gob is molded into an optical element blank. At that time, to prevent fusion of the glass and the mold during press molding, the surface of the press-molding glass gob can be uniformly coated in advance with a mold release agent in the form of a powder, such as boron nitride.

The mold is then opened and the optical element blank is removed from the pressing mold and annealed. The annealing reduces distortion within the glass and yields optical characteristics such as the refractive index that are of the desired values.

It suffices to apply known glass gob heating conditions, press molding conditions, materials used for the pressing mold, and the like. The above process can be conducted in air.

In the second embodiment, the pressing mold is comprised of an upper mold, a lower mold, and as needed, a mold part comprising a barrel mold. As set forth above, the molding surface of the pressing mold is processed into a shape that is the reverse of the surface shape of an optical element blank, A mold release agent in the form of a powder, such as boron nitride, is uniformly and suitably coated on the lower molding surface. The glass melt that has been prepared in accordance with the optical glass manufacturing method set forth above is caused to flow out onto the molding surface of the lower mold. When a desired quantity of glass melt has accumulated on the lower mold, the glass melt flow is severed with a cutting blade called a shear. Once a piece of glass melt has been obtained on the lower mold in this fashion, the lower mold is moved for each piece of glass melt to a position where the upper mold is waiting above, the glass is pressed by the upper and lower molds, and the glass is molded into an optical element blank.

The mold is then opened and the optical element blank is removed from the pressing mold and annealed. The annealing reduces distortion within the glass and yields optical characteristics such as the refractive index that are of the desired values.

It suffices to apply known glass gob heating conditions, press molding conditions, materials used for the pressing mold, and the like. The above process can be conducted in air.

[Optical Element]

The optical element according to an aspect of the present invention will be described next.

The optical element according to an aspect of the present invention is comprised of the optical glass according to an aspect of the present invention set forth above. The optical element according to an aspect of the present invention has the various properties imparted by the optical glass according to an aspect of the present invention set forth above. Thus, it is useful for imparting high functionality and compactness to an optical system. Examples of the optical element of the present invention are various lenses and prisms. Examples of lenses are various concave meniscus lenses, convex meniscus lenses, biconvex lenses, biconcave lenses, plano-convex lenses, and plano-concave lenses with lens surfaces that are spherical or aspherical.

The lens can correct chromatic aberration by combining it with a lens made of ultra-low dispersion glass and is suitable as a lens for chromatic aberration correction. It is also an effective lens for rendering optical systems compact. The optical element according to an aspect of the present invention is made of glass with a lower $\Delta Pg,F$ than other optical glasses having equivalent refractive indexes and Abbé numbers, and is thus suited to high-order chromatic aberration correction. For example, by combining it with a lens made of an ultra-low dispersion glass having positive anomalous partial dispersion, it is possible to achieve high-order chromatic aberration correction in a compact optical system.

By having a high refractive index, a prism can be combined in an image pickup optical system to achieve an optical system that is compact and has a wide viewing angle by bending the path of the light and directing it in a desired direction.

A film for controlling light transmittance, such as an antireflective film, can be provided on the optically functional surface of the optical element according to an aspect of the present invention.

The method of manufacturing the above optical element will be described next.

The above optical element can be prepared by processing the above optical element blank. Since optical glass with good processing property can be used as the optical glass constituting the optical element blank, known methods can be applied as the processing methods.

The present invention will be described in greater detail through embodiments below. However, the present invention is not limited in any way to the forms set forth in the embodiments. By referring to the embodiments described below and applying the method of adjusting the contents of the various glass components set forth above, it is possible to obtain the optical glass according to an aspect of the present invention.

EXAMPLES

The present invention is further described below through Examples. However, the present invention is not limited to the embodiments given in Examples. By referencing Examples set forth below and applying the methods of adjusting the contents of the various glass components set forth above, it is possible to obtain optical glasses according to the various aspects of the present invention.

Example 1

First, various starting material powders in the form of nitrates, sulfates, hydroxides, oxides, boric acid, and the like were weighed out and thoroughly stirred in a manner that would yield oxide glasses Nos. 1 to 22 having the compositions indicated in Table 1 (given as cation %) to obtain mixed starting materials. Each mixed starting material was charged to a platinum crucible or a platinum alloy crucible, heated to 1,400° C., melted, clarified, and stirred to obtain a homogeneous glass melt.

The glass melt was caused to flow into a preheated casting mold, rapidly cooled, and maintained for 2 hours at a temperature in the vicinity of the glass transition temperature. It was then gradually cooled to obtain the optical glass of one of oxide glasses Nos. 1 to 22. No crystal precipitation or mixing in of foreign material such as platinum inclusion was observed in any of the glasses.

The anion component of oxides glasses Nos. 1 to 15 was entirely $O^{2-}$.

The characteristics of the various glasses were measured by the methods given below. The measurement results are given in Table 1.

(1) Refractive Index nd and Abbé Number νd

Optical glass that had been cooled at a rate of 30° C. per hour was subjected to the measurement.

(2) Partial Dispersion Ratio Pg,F and the Difference ΔPg,F from the Normal Line of the Partial Dispersion Ratio The partial dispersion ratio Pg,F was calculated from values measured for the refractive indexes ng, nF, nC by the method set forth below for optical glasses that had been cooled at a temperature decrease rate of 30° C. per hour.

For a total of 15 spectral lines of t (1013.98 nm), s (852.11 nm), A' (768.19 nm), r (706.52 nm), C (656.27 nm), C' (643.85 nm), 632.8 (682.8 nm), D (589.29 nm), d (587.56 nm), e (546.07 nm), F (486.13 nm), F' (479.99 nm), g (435.84 nm), h (404.66 nm), and i (365.01 nm), the refractive index n was measured at various wavelengths λ.

Using these refractive indexes, the constants ($A_0$, $A_1$, $A_2$, $A_3$, $A_4$, and $A_5$) of the dispersion equation (x) below were calculated by the least squares method. The constants that had been calculated were used to calculate ng, nF, and nC from the following dispersion equation (x), and Pg,F was obtained.

$$n^2 = A_0 + A_1\lambda^2 + A_2\lambda^{-2} + A_3\lambda^{-4} + A_4\lambda^{-6} + A_5\lambda^{-8} \qquad (x)$$

The difference ΔPg,F from the normal line of the partial dispersion ratio was calculated from the partial dispersion ratio Pg,F(0) on the normal line calculated from the partial dispersion ratio Pg,F and the Abbé number νd.

(3) Glass Transition Temperature Tg

Measurement was conducted under conditions of a temperature increase rate of 4° C./minute using a thermomechanical analyzer.

(4) Yield Point

Measurement was conducted under conditions of a temperature increase rate of 4° C./minute using a thermomechanical analyzer.

(5) Liquidus Temperature

The glass was placed in a furnace that had been heated to a prescribed temperature, kept there for 2 hours, and cooled. The interior of the glass was then observed at 100× magnification with an optical microscope and the liquidus temperature was determined by whether or not crystals were present.

(6) Specific Gravity

Measurement was conducted by Archimedes' method.

(7) λ70, λ5

Glass samples having mutually parallel surfaces that had been polished to a thickness of 10.0±0.1 mm were employed. Using a spectrophotometer, light of intensity Iin was directed in from a direction perpendicular to the polished surface, and the intensity Tout of the light that passed through the sample was measured. The light transmittance Iout/Iin was calculated, and the wavelength at which the light transmittance reached 70% was adopted as λ70. That at which the light transmittance reached 5% was adopted as λ5.

TABLE 1

| | No. | | | | |
|---|---|---|---|---|---|
| | 1 | 2 | 3 | 4 | 5 |
| Cation component | cation % | cation % | cation % | cation % | cation % |
| $Si^{4+}$ | 9.72 | 9.58 | 9.48 | 9.58 | 9.58 |
| $B^{3+}$ | 30.42 | 30.42 | 30.13 | 30.42 | 30.42 |
| $La^{3+}$ | 28.4 | 28.9 | 29.61 | 28.9 | 28.9 |
| $Gd^{3+}$ | 5.17 | 5.17 | 5.12 | 5.17 | 5.17 |
| $Y^{3+}$ | 1.36 | 1.36 | 1.35 | 1.36 | 1.36 |
| $Yb^{3+}$ | 0 | 0 | 0 | 0 | 0 |
| $Ti^{4+}$ | 10.99 | 10.63 | 10.52 | 8.61 | 6.59 |
| $Nb^{5+}$ | 5.61 | 5.61 | 5.55 | 5.61 | 5.61 |
| $W^{6+}$ | 0 | 0 | 0 | 2.02 | 4.04 |
| $Bi^{3+}$ | 0 | 0 | 0 | 0 | 0 |
| $Ta^{5+}$ | 0 | 0 | 0 | 0 | 0 |
| $Zr^{4+}$ | 4.67 | 4.67 | 4.62 | 4.67 | 4.67 |
| $Zn^{2+}$ | 3.66 | 3.66 | 3.62 | 3.66 | 3.66 |
| $Li^{+}$ | 0 | 0 | 0 | 0 | 0 |
| $Na^{+}$ | 0 | 0 | 0 | 0 | 0 |
| $K^{+}$ | 0 | 0 | 0 | 0 | 0 |
| $Mg^{2+}$ | 0 | 0 | 0 | 0 | 0 |
| $Ca^{2+}$ | 0 | 0 | 0 | 0 | 0 |
| $Sr^{2+}$ | 0 | 0 | 0 | 0 | 0 |
| $Ba^{2+}$ | 0 | 0 | 0 | 0 | 0 |
| $Ge^{4+}$ | 0 | 0 | 0 | 0 | 0 |
| $Te^{4+}$ | 0 | 0 | 0 | 0 | 0 |
| $Al^{3+}$ | 0 | 0 | 0 | 0 | 0 |
| Total | 100 | 100 | 100 | 100 | 100 |
| $Si^{4+} + B^{3+}$ | 40.14 | 40 | 39.61 | 40 | 40 |
| $Si^{4+}/B^{3+}$ | 0.32 | 0.31 | 0.31 | 0.31 | 0.31 |
| $La^{3+} + Gd^{3+} + Y^{3+} + Yb^{3+}$ | 34.93 | 35.43 | 36.08 | 35.43 | 35.43 |
| $Ti^{4+} + Nb^{5+} + W^{6+} + Bi^{3+}$ | 16.6 | 16.24 | 16.07 | 16.24 | 16.24 |
| $Ti^{4+}/Nb^{5+}$ | 1.96 | 1.89 | 1.90 | 1.53 | 1.17 |
| $(La^{3+} + Gd^{3+} + Y^{3+} + Yb^{3+})/(Ti^{4+} + Nb^{5+} + W^{6+} + Bi^{3+})$ | 2.104 | 2.182 | 2.245 | 2.182 | 2.182 |
| $Ti^{4+} + Nb^{5+} + Ta^{5+} + W^{6+} + Bi^{3+}$ | 16.6 | 16.24 | 16.07 | 16.24 | 16.24 |
| $Gd^{3+} + Y^{3+} + Yb^{3+}$ | 6.53 | 6.53 | 6.47 | 6.53 | 6.53 |
| $Li^{+} + Na^{+} + K^{+}$ | 0 | 0 | 0 | 0 | 0 |
| $Mg^{2+} + Ca^{2+} + Sr^{2+} + Ba^{2+}$ | 0 | 0 | 0 | 0 | 0 |
| $Y^{3+}/(La^{3+} + Gd^{3+} + Y^{3+} + Yb^{3+})$ | 0.039 | 0.038 | 0.037 | 0.038 | 0.038 |
| $(La^{3+} + Gd^{3+} + Y^{3+} + Yb^{3+})/(Si^{4+} + B^{3+})$ | 0.87 | 0.89 | 0.91 | 0.89 | 0.89 |
| $(Ti^{4+} + Nb^{5+} + W^{6+} + Bi^{3+})/(Si^{4+} + B^{3+})$ | 0.41 | 0.41 | 0.41 | 0.41 | 0.41 |
| nd | 1.950 | 1.950 | 1.950 | 1.948 | 1.944 |
| νd | 32.3 | 32.5 | 32.5 | 32.6 | 32.8 |
| $P_{g,F}$ | 0.5902 | 0.5896 | 0.5894 | 0.5896 | 0.5893 |
| $\Delta P_{g,F}$ | 0.0001 | −0.0003 | −0.0004 | 0.0000 | 0.0000 |
| Specific gravity | 5.07 | 5.08 | 5.09 | 5.17 | 5.26 |
| Glass transition temperature (° C.) | 696 | 696 | 698 | 694 | 689 |
| Yield point (° C.) | 746 | 745 | 748 | 742 | 737 |
| Liquidus temperature (° C.) | 1180 | 1190 | 1190 | 1230 | 1230 |
| λ70 (nm) | 426 | 426 | 428 | 425 | 419 |
| λ5 (nm) | 359 | 359 | 358 | 360 | 360 |

| | No. | | | | |
|---|---|---|---|---|---|
| | 6 | 7 | 8 | 9 | 10 |
| Cation component | cation % | cation % | cation % | cation % | cation % |
| $Si^{4+}$ | 9.58 | 9.58 | 9.58 | 9.58 | 9.58 |
| $B^{3+}$ | 27.39 | 29.41 | 29.41 | 30.42 | 30.42 |
| $La^{3+}$ | 28.9 | 26.88 | 24.86 | 28.65 | 28.65 |
| $Gd^{3+}$ | 5.17 | 8.2 | 10.22 | 5.17 | 6.53 |
| $Y^{3+}$ | 1.36 | 2.37 | 2.37 | 1.36 | 0 |
| $Yb^{3+}$ | 0 | 0 | 0 | 0 | 0 |
| $Ti^{4+}$ | 10.63 | 9.62 | 9.62 | 9.87 | 10.13 |
| $Nb^{5+}$ | 5.61 | 5.61 | 5.61 | 6.11 | 6.11 |
| $W^{6+}$ | 0 | 0 | 0 | 0 | 0 |

TABLE 1-continued

| | | | | | |
|---|---|---|---|---|---|
| $Bi^{3+}$ | 0 | 0 | 0 | 0 | 0 |
| $Ta^{5+}$ | 0 | 0 | 0 | 0 | 0 |
| $Zr^{4+}$ | 4.67 | 4.67 | 4.67 | 5.18 | 4.92 |
| $Zn^{2+}$ | 3.66 | 3.66 | 3.66 | 3.66 | 3.66 |
| $Li^+$ | 0 | 0 | 0 | 0 | 0 |
| $Na^+$ | 0 | 0 | 0 | 0 | 0 |
| $K^+$ | 0 | 0 | 0 | 0 | 0 |
| $Mg^{2+}$ | 0 | 0 | 0 | 0 | 0 |
| $Ca^{2+}$ | 0 | 0 | 0 | 0 | 0 |
| $Sr^{2+}$ | 0 | 0 | 0 | 0 | 0 |
| $Ba^{2+}$ | 0 | 0 | 0 | 0 | 0 |
| $Ge^{4+}$ | 0 | 0 | 0 | 0 | 0 |
| $Te^{4+}$ | 0 | 0 | 0 | 0 | 0 |
| $Al^{3+}$ | 3.03 | 0 | 0 | 0 | 0 |
| Total | 100 | 100 | 100 | 100 | 100 |
| $Si^{4+} + B^{3+}$ | 36.97 | 38.99 | 38.99 | 40 | 40 |
| $Si^{4+}/B^{3+}$ | 0.35 | 0.33 | 0.33 | 0.31 | 0.31 |
| $La^{3+} + Gd^{3+} + Y^{3+} + Yb^{3+}$ | 35.43 | 37.45 | 37.45 | 35.18 | 35.18 |
| $Ti^{4+} + Nb^{5+} + W^{6+} + Bi^{3+}$ | 16.24 | 15.23 | 15.23 | 15.98 | 16.24 |
| $Ti^{4+}/Nb^{5+}$ | 1.89 | 1.71 | 1.71 | 1.62 | 1.66 |
| $(La^{3+} + Gd^{3+} + Y^{3+} + Yb^{3+})/(Ti^{4+} + Nb^{5+} + W^{6+} + Bi^{3+})$ | 2.182 | 2.459 | 2.459 | 2.202 | 2.166 |
| $Ti^{4+} + Nb^{5+} + Ta^{5+} + W^{6+} + Bi^{3+}$ | 16.24 | 15.23 | 15.23 | 15.98 | 16.24 |
| $Gd^{3+} + Y^{3+} + Yb^{3+}$ | 6.53 | 10.57 | 12.59 | 6.53 | 6.53 |
| $Li^+ + Na^+ + K^+$ | 0 | 0 | 0 | 0 | 0 |
| $Mg^{2+} + Ca^{2+} + Sr^{2+} + Ba^{2+}$ | 0 | 0 | 0 | 0 | 0 |
| $Y^{3+}/(La^{3+} + Gd^{3+} + Y^{3+} + Yb^{3+})$ | 0.038 | 0.063 | 0.063 | 0.039 | 0.000 |
| $(La^{3+} + Gd^{3+} + Y^{3+} + Yb^{3+})/(Si^{4+} + B^{3+})$ | 0.96 | 0.96 | 0.96 | 0.88 | 0.88 |
| $(Ti^{4+} + Nb^{5+} + W^{6+} + Bi^{3+})/(Si^{4+} + B^{3+})$ | 0.44 | 0.39 | 0.39 | 0.40 | 0.41 |
| nd | 1.950 | 1.948 | 1.948 | 1.949 | 1.951 |
| vd | 32.6 | 33.2 | 33.3 | 32.7 | 32.6 |
| $P_{g,F}$ | 0.5894 | 0.5880 | 0.5881 | 0.5888 | 0.5896 |
| $\Delta Pg, F$ | -0.0003 | -0.0005 | -0.0004 | -0.0006 | 0.0000 |
| Specific gravity | 5.08 | 5.19 | 5.22 | 5.09 | 5.12 |
| Glass transition temperature(° C.) | 708 | 708 | 709 | 698 | 698 |
| Yield point(° C.) | 759 | 757 | 759 | 747 | 747 |
| Liquidus temperature (° C.) | 1210 | 1240 | 1260 | 1220 | 1220 |
| λ 70(nm) | 428 | 423 | 416 | 421 | 423 |
| λ 5(nm) | 357 | 356 | 356 | 356 | 358 |

| | No. | | | | |
|---|---|---|---|---|---|
| | 11 | 12 | 13 | 14 | 15 |
| Cation component | cation % | cation % | cation % | cation % | cation % |
| $Si^{4+}$ | 9.56 | 9.58 | 9.58 | 9.58 | 9.72 |
| $B^{3+}$ | 30.42 | 30.42 | 29.4 | 29.4 | 30.42 |
| $La^{3+}$ | 28.4 | 28.39 | 32.56 | 32.56 | 28.4 |
| $Gd^{3+}$ | 5.17 | 5.17 | 0 | 0 | 5.17 |
| $Y^{3+}$ | 1.36 | 1.36 | 1.36 | 1.36 | 1.36 |
| $Yb^{3+}$ | 0 | 0 | 0 | 0 | 0 |
| $Ti^{4+}$ | 8.11 | 10.13 | 4.55 | 4.55 | 10.99 |
| $Nb^{5+}$ | 5.61 | 3.59 | 9.52 | 7.5 | 5.61 |
| $W^{6+}$ | 0 | 0 | 0 | 0 | 0 |
| $Bi^{3+}$ | 0 | 0 | 0 | 0 | 0 |
| $Ta^{5+}$ | 3.04 | 3.03 | 4.7 | 6.72 | 0 |
| $Zr^{4+}$ | 4.67 | 4.67 | 4.67 | 4.67 | 4.67 |
| $Zn^{2+}$ | 3.66 | 3.66 | 3.66 | 3.66 | 1.64 |
| $Li^+$ | 0 | 0 | 0 | 0 | 0 |
| $Na^+$ | 0 | 0 | 0 | 0 | 0 |
| $K^+$ | 0 | 0 | 0 | 0 | 0 |
| $Mg^{2+}$ | 0 | 0 | 0 | 0 | 0 |
| $Ca^{2+}$ | 0 | 0 | 0 | 0 | 0 |
| $Sr^{2+}$ | 0 | 0 | 0 | 0 | 0 |
| $Ba^{2+}$ | 0 | 0 | 0 | 0 | 2.02 |
| $Ge^{4+}$ | 0 | 0 | 0 | 0 | 0 |
| $Te^{4+}$ | 0 | 0 | 0 | 0 | 0 |
| $Al^{3+}$ | 0 | 0 | 0 | 0 | 0 |
| Total | 100 | 100 | 100 | 100 | 100 |
| $Si^{4+} + B^{3+}$ | 39.98 | 40 | 38.98 | 38.98 | 40.14 |
| $Si^{4+}/B^{3+}$ | 0.31 | 0.31 | 0.33 | 0.33 | 0.32 |
| $La^{3+} + Gd^{3+} + Y^{3+} + Yb^{3+}$ | 34.93 | 34.92 | 33.92 | 33.92 | 34.93 |
| $Ti^{4+} + Nb^{5+} + W^{6+} + Bi^{3+}$ | 13.72 | 13.72 | 14.07 | 12.05 | 16.6 |
| $Ti^{4+}/Nb^{5+}$ | 1.45 | 2.82 | 0.48 | 0.61 | 1.96 |
| $(La^{3+} + Gd^{3+} + Y^{3+} + Yb^{3+})/(Ti^{4+} + Nb^{5+} + W^{6+} + Bi^{3+})$ | 2.546 | 2.545 | 2.411 | 2.815 | 2.104 |

TABLE 1-continued

| | | | | | |
|---|---|---|---|---|---|
| $Ti^{4+} + Nb^{5+} + Ta^{5+} + W^{6+} + Bi^{3+}$ | 16.76 | 16.75 | 18.77 | 18.77 | 16.6 |
| $Gd^{3+} + Y^{3+} + Yb^{3+}$ | 6.53 | 6.53 | 1.36 | 1.36 | 6.53 |
| $Li^+ + Na^+ + K^+$ | 0 | 0 | 0 | 0 | 0 |
| $Mg^{2+} + Ca^{2+} + Sr^{2+} + Ba^{2+}$ | 0 | 0 | 0 | 0 | 2.02 |
| $Y^{3+}/(La^{3+} + Gd^{3+} + Y^{3+} + Yb^{3+})$ | 0.039 | 0.039 | 0.040 | 0.040 | 0.039 |
| $(La^{3+} + Gd^{3+} + Y^{3+} + Yb^{3+})/(Si^{4+} + B^{3+})$ | 0.87 | 0.87 | 0.87 | 0.87 | 0.87 |
| $(Ti^{4+} + Nb^{5+} + W^{6+} + Bi^{3+})/(Si^{4+} + B^{3+})$ | 0.34 | 0.34 | 0.36 | 0.31 | 0.41 |
| nd | 1.947 | 1.947 | 1.954 | 1.952 | 1.945 |
| νd | 33.2 | 33.0 | 33.0 | 33.4 | 32.5 |
| $P_{g,F}$ | 0.5870 | 0.5888 | 0.5869 | 0.5840 | 0.5898 |
| $\Delta P_{g,F}$ | −0.0015 | −0.0001 | −0.0020 | −0.0042 | 0.0000 |
| Specific gravity | 5.23 | 5.21 | 5.24 | 5.33 | 5.09 |
| Glass transition temperature(° C.) | 699 | 701 | 702 | 703 | 697 |
| Yield point(° C.) | 749 | 751 | 752 | 753 | 746 |
| Liquidus temperature (° C.) | 1250 | 1200 | 1260 | 1260 | 1220 |
| λ 70(nm) | 419 | 423 | 409 | 409 | 424 |
| λ 5(nm) | 354 | 356 | 351 | 350 | 356 |

| | No. | | | | | | |
|---|---|---|---|---|---|---|---|
| Cation component | 16 cation % | 17 cation % | 18 cation % | 19 cation % | 20 cation % | 21 cation % | 22 cation % |
| $Si^{4+}$ | 9.68 | 10.09 | 8.72 | 12.72 | 15.72 | 9.53 | 9.92 |
| $B^{3+}$ | 30.49 | 31.57 | 34.42 | 27.42 | 24.42 | 29.83 | 31.05 |
| $La^{3+}$ | 27.77 | 29.48 | 28.4 | 28.4 | 28.4 | 27.84 | 28.98 |
| $Gd^{3+}$ | 5.24 | 5.37 | 5.17 | 5.17 | 5.17 | 5.07 | 5.28 |
| $Y^{3+}$ | 1.46 | 1.41 | 1.36 | 1.36 | 1.36 | 1.33 | 1.39 |
| $Yb^{3+}$ | 0 | 0 | 0 | 0 | 0 | 0 | 0 |
| $Ti^{4+}$ | 11.40 | 11.41 | 10.99 | 10.99 | 10.99 | 10.77 | 11.21 |
| $Nb^{5+}$ | 5.49 | 5.82 | 5.61 | 5.61 | 5.61 | 5.5 | 5.72 |
| $W^{6+}$ | 0 | 0 | 0 | 0 | 0 | 0 | 0 |
| $Bi^{3+}$ | 0 | 0 | 0 | 0 | 0 | 0 | 0 |
| $Ta^{5+}$ | 0 | 0 | 0 | 0 | 0 | 0 | 0 |
| $Zr^{4+}$ | 4.60 | 4.85 | 4.67 | 4.67 | 4.67 | 6.54 | 2.72 |
| $Zn^{2+}$ | 3.87 | 0 | 0.66 | 3.66 | 3.66 | 3.59 | 3.73 |
| $Li^+$ | 0 | 0 | 0 | 0 | 0 | 0 | 0 |
| $Na^+$ | 0 | 0 | 0 | 0 | 0 | 0 | 0 |
| $K^+$ | 0 | 0 | 0 | 0 | 0 | 0 | 0 |
| $Mg^{2+}$ | 0 | 0 | 0 | 0 | 0 | 0 | 0 |
| $Ca^{2+}$ | 0 | 0 | 0 | 0 | 0 | 0 | 0 |
| $Sr^{2+}$ | 0 | 0 | 0 | 0 | 0 | 0 | 0 |
| $Ba^{2+}$ | 0 | 0 | 0 | 0 | 0 | 0 | 0 |
| $Ge^{4+}$ | 0 | 0 | 0 | 0 | 0 | 0 | 0 |
| $Te^{4+}$ | 0 | 0 | 0 | 0 | 0 | 0 | 0 |
| $Al^{3+}$ | 0 | 0 | 0 | 0 | 0 | 0 | 0 |
| Total | 100 | 100 | 100 | 100 | 100 | 100 | 100 |
| $Si^{4+} + B^{3+}$ | 40.17 | 41.66 | 43.14 | 40.14 | 40.14 | 39.36 | 40.97 |
| $Si^{4+}/B^{3+}$ | 0.32 | 0.32 | 0.25 | 0.46 | 0.64 | 0.32 | 0.32 |
| $La^{3+} + Gd^{3+} + Y^{3+} + Yb^{3+}$ | 34.47 | 36.26 | 34.93 | 34.93 | 34.93 | 34.24 | 35.65 |
| $Ti^{4+} + Nb^{5+} + W^{6+} + Bi^{3+}$ | 16.89 | 17.23 | 16.60 | 16.60 | 16.60 | 16.27 | 16.93 |
| $Ti^{4+}/Nb^{5+}$ | 2.08 | 1.96 | 1.96 | 1.96 | 1.96 | 1.96 | 1.96 |
| $(La^{3+} + Gd^{3+} + Y^{3+} + Yb^{3+})/(Ti^{4+} + Nb^{5+} + W^{6+} + Bi^{3+})$ | 2.040 | 2.104 | 2.104 | 2.104 | 2.104 | 2.104 | 2.106 |
| $Ti^{4+} + Nb^{5+} + Ta^{5+} + W^{6+} + Bi^{3+}$ | 16.89 | 17.23 | 16.60 | 16.60 | 16.60 | 16.27 | 16.93 |
| $Gd^{3+} + Y^{3+} + Yb^{3+}$ | 6.70 | 6.78 | 6.53 | 6.53 | 6.53 | 6.40 | 6.67 |
| $Li^+ + Na^+ + K^+$ | 0 | 0 | 0 | 0 | 0 | 0 | 0 |
| $Mg^{2+} + Ca^{2+} + Sr^{2+} + Ba^{2+}$ | 0 | 0 | 0 | 0 | 0 | 0 | 0 |
| $Y^{3+}/(La^{3+} + Gd^{3+} + Y^{3+} + Yb^{3+})$ | 0.042 | 0.039 | 0.039 | 0.039 | 0.039 | 0.039 | 0.039 |
| $(La^{3+} + Gd^{3+} + Y^{3+} + Yb^{3+})/(Si^{4+} + B^{3+})$ | 0.86 | 0.87 | 0.81 | 0.87 | 0.87 | 0.87 | 0.87 |
| $(Ti^{4+} + Nb^{5+} + W^{6+} + Bi^{3+})/(Si^{4+} + B^{3+})$ | 0.42 | 0.41 | 0.38 | 0.41 | 0.41 | 0.41 | 0.41 |
| nd | 1.951 | 1.95119 | 1.94496 | 1.94471 | 1.93907 | 1.95634 | 1.94623 |
| νd | 32.1 | 32.19 | 32.44 | 32.46 | 32.58 | 32.29 | 32.57 |
| $P_{g,F}$ | 0.59097 | 0.5908 | 0.5902 | 0.5901 | 0.5899 | 0.5903 | 0.5902 |
| $\Delta P_{g,F}$ | 0.0004 | 0.0004 | 0.0003 | 0.0002 | 0.0002 | 0.0001 | 0.0005 |
| Specific gravity | 5.05 | 5.04 | 5 | 5.04 | 5.01 | 5.08 | 5.07 |
| Glass transition temperature(° C.) | 696 | 705 | 697 | 694 | 701 | 690 | 686 |
| Yield point(° C.) | 743 | 746 | 732 | 741 | 752 | 738 | 732 |
| Liquidus temperature (° C.) | 1180 | 1190 | 1180 | 1230 | 1250 | 1250 | 1200 |
| λ 70(nm) | 431 | 433 | 431 | 436 | 438 | 436 | 434 |
| λ 5(nm) | 360 | 360 | 360 | 359 | 360 | 359 | 358 |

Example 2

Press-Molding Glass Gobs Comprised of the Various Optical Glasses of Example 1 were Prepared as Set Forth Below First, glass starting materials were blended so as to obtain each of the above glasses, charged to a platinum crucible or a platinum alloy crucible, and heated, melted, clarified, and stirred to obtain a homogeneous glass melt. Next, the glass melt was caused to flow at a constant flow rate out of an outflow pipe, cast into a casting mold positioned horizontally beneath the outflow pipe, and molded into a glass plate of constant thickness. The molded glass plate was continuously drawn in a horizontal direction through an opening provided in the lateral surface of the casting mold, conveyed by a conveyor belt to an annealing furnace, and gradually cooled.

The gradually cooled glass plate was cut or severed to prepare glass pieces. The glass pieces were barrel polished to obtain press-molding glass gobs.

It is also possible to position a cylindrical casting mold beneath the outflow pipe, cast the glass melt into the casting mold, mold it into cylindrical glass, draw it vertically downward at a constant rate from an opening in the bottom of the casting mold, gradually cool it, and cut or sever it to obtain glass pieces. These pieces can also be barrel polished to obtain press-molding glass gobs.

Example 3

In the same manner as in Example 2, a glass melt was caused to flow out of an outflow pipe, the lower end of the glass melt flowing out was received in a mold, the mold was quickly dropped to sever the flow of glass melt by means of surface tension, and a piece of glass melt of desired quantity was obtained on the mold. Gas was blown from the mold to apply upward air pressure to the glass, the glass piece was molded while being floated, and the glass piece was removed from the mold and annealed. The glass piece was then barrel polished to obtain press-molding glass gobs.

Example 4

After uniformly coating a mold release agent comprised of boron nitride powder over the entire surface of each of the press-molding glass gobs that had been obtained in Example 3, each of the gobs was softened by heating and press molded to obtain the blanks of various prisms and lenses, such as concave meniscus lenses, convex meniscus lenses, biconvex lenses, biconcave lenses, plano-convex lenses, and plano-concave lenses.

Example 5

A glass melt was prepared in the same manner as in Example 2 and fed onto the molding surface of a lower mold that had been uniformly coated with a mold release agent in the form of boron nitride powder. When the glass melt accumulating on the lower mold had reached a desired quantity, the glass melt flow was cut with a shear.

The glass melt piece that had been thus obtained on the lower mold was pressed between the upper mold and the lower mold to prepare the blanks of various prisms and lenses, such as concave meniscus lenses, convex meniscus lenses, biconvex lenses, biconcave lenses, plano-convex lenses, and plano-concave lenses.

Example 6

The various blanks that had been prepared in Examples 4 and 5 were annealed. The annealing reduced distortion within the glass and yielded optical characteristics such as the refractive index that were of the desired values.

Next, the various blanks were ground and polished to prepare various prisms and lenses, such as concave meniscus lenses, convex meniscus lenses, biconvex lenses, biconcave lenses, plano-convex lenses, and plano-concave lenses. It was also possible to coat antireflective films on the surfaces of the optical elements obtained.

Example 7

Glass plates and cylindrical glass pieces were prepared in the same manner as in Example 2. The molded glass articles obtained were annealed to reduce distortion within the glass and yield optical characteristics such as the refractive index that were of the desired values.

Next, these molded glass articles were cut, ground and polished to prepare various prisms and lenses, such as concave meniscus lenses, convex meniscus lenses, biconvex lenses, biconcave lenses, plano-convex lenses, and plano-concave lenses. It was also possible to coat antireflective films on the surfaces of the optical elements obtained.

An aspect of the present invention can provide optical glass with a high refractive index and low dispersion properties that is suitable as an optical element material for chromatic aberration correction and that can be provided stably and with good glass stability. Using such optical glass, it is possible to provide a press-molding glass gob, an optical element blank, and an optical element.

Study on the Cation Ratio ($Y^{3+}/(La^{3+}+Gd^{3+}+Y^{3+}+Yb^{3+})$)

Figure 2:
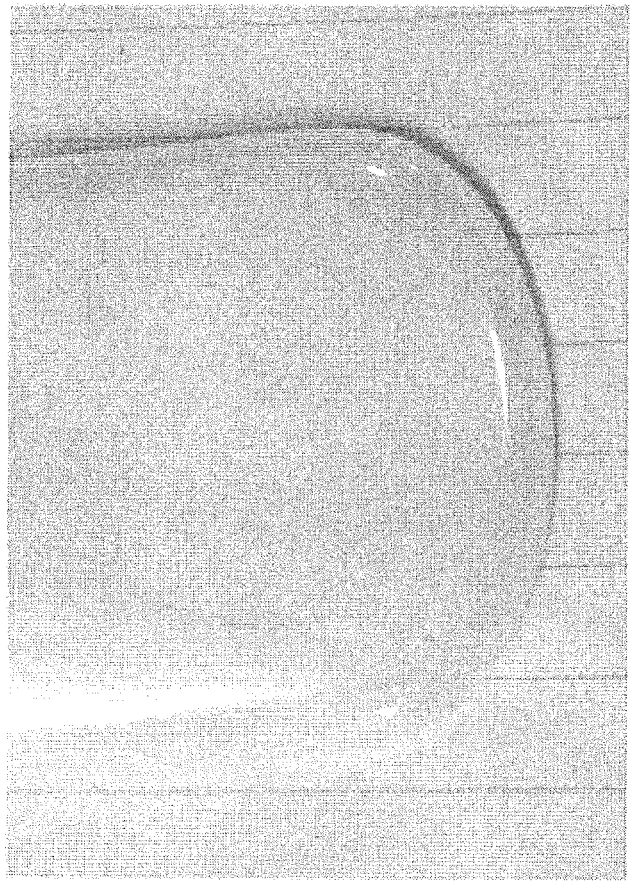
FIG. 2 is a digital camera photograph showing poor glass stability of optical glass with a cation ratio of $(Y^{3+}/(La^{3+}+Gd^{3+}+Y^{3+}+Yb^{3+}))$ exceeding 0.180.

FIGS. 1 and 2 are digital camera photographs showing the poor glass stability of optical glass in which the cation ratio ($Y^{3+}/(La^{3+}+Gd^{3+}+Y^{3+}+Yb^{3+})$) exceeds 0.180. FIGS. 1 and 2 will be described in detail below.

Optical glasses A and B shown in Table 2 have compositions in which the cation ratio, $Y^{3+}/(La^{3+}+Gd^{3+}+Y^{3+}+Yb^{3+})$, exceeds 0.180. With the exception that $Sb_2O_3$ was employed instead of $As_2O_3$, which is a component the incorporation of which should be avoided out of consideration for the environment, optical glasses A and B have the glass compositions of Examples 7 and 8 of Japanese Unexamined Patent Publication (KOKAI) Showa No. 60-131845. Changing the clarifying agent from $As_2O_3$ to $Sb_2O_3$ affected the resistance to devitrification of the glass almost not at all. Optical glasses A and B were prepared in a manner faithful to the description given in Examples of the above publication. FIG. 1 is a digital camera photograph of optical glass A in a crucible, and FIG. 2 is a digital camera photograph of optical glass B as dripped onto paper. As indicated in FIGS. 1 and 2, both optical glasses A and B ended up crystalizing, precluding the obtaining of homogeneous glass.

TABLE 2

| | A | B |
|---|---|---|
| Component (cation %) | | |
| Si | 8.51 | 10.45 |
| B | 19.59 | 16.41 |
| Al | 0.00 | 0.00 |
| P | 1.60 | 1.61 |
| Ba | 0.00 | 0.00 |
| Ti | 5.83 | 15.01 |
| Zr | 5.90 | 5.93 |
| Y | 8.55 | 8.19 |
| Gd | 0.00 | 0.00 |
| La | 36.94 | 33.63 |
| Nb | 11.11 | 1.29 |

TABLE 2-continued

|  | A | B |
|---|---|---|
| Ta | 1.75 | 7.24 |
| Bi | 0.00 | 0.00 |
| Sn | 0.00 | 0.00 |
| Sb | 0.23 | 0.23 |
| Pb | 0.00 | 0.00 |
| Total | 100 | 100 |
| Cation ratio, total content (cation basis) | | |
| Si + B | 28.09 | 26.86 |
| La + Gd + Y + Yb | 45.49 | 41.83 |
| Ti + Nb + W + Bi | 16.94 | 16.30 |
| Nb | 11.11 | 1.29 |
| Li | 0 | 0 |
| Ge | 0 | 0 |
| Si/B | 0.434276 | 0.636938 |
| (La + Gd + Y + Yb)/(Ti + Nb + W + Bi) | 2.685145 | 2.56637 |
| Y/(La + Gd + Y + Yb) | 0.188012 | 0.195905 |
| Ti/Nb | 0.524588 | 11.6433 |

Study on ΔPg,F

Figure 3:
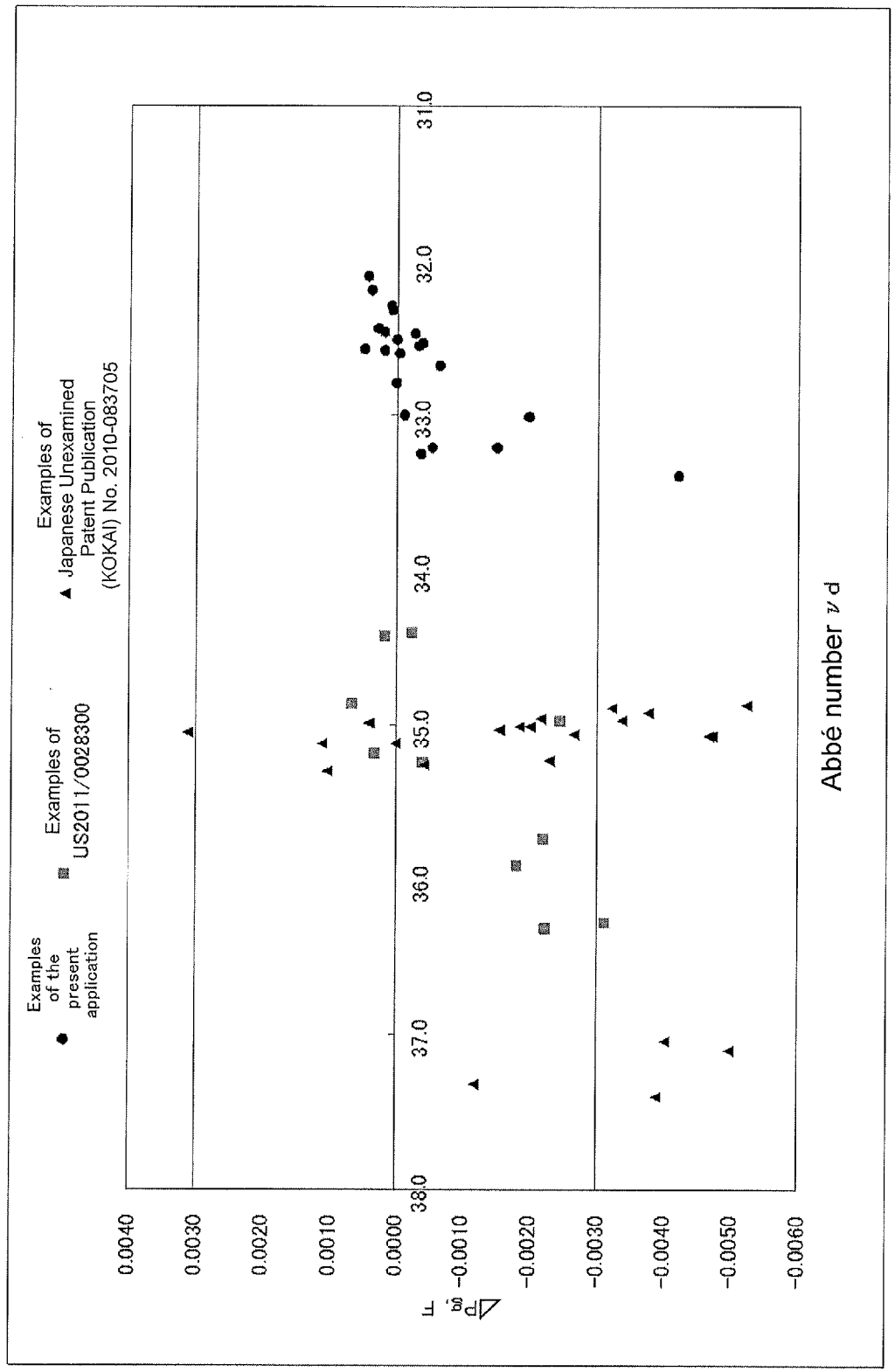
FIG. 3 is a graph plotting the $\Delta Pg,F$, calculated from the above equation, against the Abbé number vd for the optical glasses shown in Table 1, Examples of US2011/0028300A1, and Examples of Japanese Unexamined Patent Publication (KOKAI) No. 2010-30879.

FIG. 3 is a graph in which the ΔPg,F calculated from the above equation has been plotted against the Abbé number vd for the optical glasses shown in Table 1, Examples of US2011/0028300A1, and Examples of Japanese Unexamined Patent Publication (KOKAI) No. 2010-083705. The fact that Examples of US2011/0028300A1 and Examples of Japanese Unexamined Patent Publication (KOKAI) No. 2010-083705 did not have the partial dispersion characteristic of a ΔPg,F of equal to or lower than 0.0005 along with an Abbé number vd indicating low dispersion and falling within the range of 28.0 to 34.0 can be seen from FIG. 3.

The implementation modes that have been disclosed herein are but examples in all regards and are not to be considered as limitations. The scope of the present invention is disclosed by the scope of the claims and not by the description given above. All modifications falling within the meaning and scope that are equivalent to the scope of the claims are intended to be covered.

The invention claimed is:

1. Optical glass, which is oxide glass wherein:
a total content of $Si^{4+}$ and $B^{3+}$ ranges from 10 to 60 cation %;
a total content of $La^{3+}$, $Gd^{3+}$, $Y^{3+}$, and $Yb^{3+}$ ranges from 25 to 70 cation %;
a total content of $Ti^{4+}$, $Nb^{5+}$, $W^6$ and $Bi^{3+}$ ranges from 10 to 20 cation %;
a content of $Li^+$ ranges from 0 to 5.0 cation %;
a content of Ge is lower than 5.0 mass % as a quantity of $GeO_2$ in a glass composition based on oxides;
no Pb is comprised;
a cation ratio of a content of $Si^{4+}$ to a content of $B^{3+}$, $Si^4/B^{3+}$, is equal to or lower than 0.70;
a cation ratio of the total content of $La^{3+}$, $Gd^{3+}$, $Y^{3+}$, and $Yb^{3+}$ to the total content of $Ti^{4+}$, $Nb^{5+}$, $W^{6+}$, and $Bi^{3+}$, $(La^{3+}+Gd^{3+}+Y^{3+}+Yb^{3+})/(Ti^{4+}+Nb^{5+}+W^{6+}+Bi^{3+})$, ranges from 1.90 to 7.00;
a cation ratio of a content of $Y^{3+}$ to the total content $La^{3+}$, $Gd^{3+}$, $Y^{3+}$, and $Yb^{3+}$, $Y^{3+}/(La^{3+}+Gd^{3+}+Y^{3+}+Yb^{3+})$, is equal to or lower than 0.180; and
$Nb^{5+}$ is comprised as an essential component, with a cation ratio of a content of $Ti^{4+}$ to a content of $Nb^{5+}$, $Ti^{4+}/Nb^{5+}$, being equal to or lower than 4.00;
which has a refractive index nd within a range of higher than 1.920 and equal to or lower than 2.000, an Abbé number vd ranging from 31.5 to 34.0, and a yield point of higher than 645° C.; and
wherein a deviation ΔPg,F from a normal line of a partial dispersion ratio Pg,F obtained from the following equation is equal to or lower than 0.0005:

$$\Delta Pg,F = Pg,F + (0.0018 \times vd) - 0.6483$$

wherein, in the equation, Pg,F denotes a partial dispersion ratio given by (ng−nF)/(nF−nC) using various refractive indexes ng, nF, and nC at spectral lines g, F, and c; and vd denotes the Abbé number.

2. The optical glass according to claim 1, wherein a content of Yb is lower than 2 mass % as a quantity of $Yb_2O_3$ in the glass composition based on oxides.

3. The optical glass according to claim 1, wherein a cation ratio of the total content of $La^{3+}$, $Gd^{3+}$, $Y^{3+}$, and $Yb^{3+}$ to a total content of $Si^{4+}$ and $B^{3+}$, $(La^{3+}+Gd^{3+}+Y^{3+}+Yb^{3+})/(Si^{4+}+B^{3+})$, is equal to or higher than 0.83, or a cation ratio of the total content of $Ti^{4+}$, $Nb^{5+}$, $W^{6+}$, and $Bi^{3+}$ to the total content of $Si^{4+}$ and $B^{3+}$, $(Ti^{4+}+Nb^{5+}+W^{6+}+Bi^{3+})/(Si^{4+}+Bi^{3+})$, is equal to or higher than 0.31.

4. The optical glass according to claim 1, wherein a total content of $Ti^{4+}$, $Nb^{5+}$, $W^{6+}$, $Bi^{3+}$, and $Ta^{5+}$ ranges from 13 to 30 cation %.

5. The optical glass according to claim 1, wherein a content of $Si^{4+}$ ranges from 1.0 to 30 cation %, a content of $B^{3+}$ ranges from 5 to 55 cation %, and a content of $La^{3+}$ ranges from 10 to 50 cation %.

6. The optical glass according to claim 1, wherein a content of $Zr^{4+}$ ranges from 1 to 15 cation %.

7. The optical glass according to claim 1, wherein a content of $Zn^{2+}$ ranges from 0 to 15 cation %.

8. The optical glass according to claim 1, which has a glass transition temperature of higher than 630° C.

9. The optical glass according to claim 1, wherein a total content of $Gd^{3+}$, $Y^{3+}$, and $Yb^{3+}$ ranges from 0.5 to 35 cation %.

10. A press-molding glass gob, which is comprised of the optical glass according to claim 1.

11. An optical element blank, which is comprised of the optical glass according to claim 1.

12. An optical element, which is comprised of the optical glass according to claim 1.

13. The optical glass according to claim 1, wherein a cation ratio of the total content of $La^{3+}$, $Gd^{3+}$, $y^{3+}$, and $Yb^{3+}$ to a total content of $Si^{4+}$ and $B^{3+}$, $(La^{3+}+Gd^{3+}+y^{3+}+Yb^{3+})/(Si^{4+}+B^{3+})$, is equal to or higher than 0.83.

14. The optical glass according to claim 1, wherein the Abbé number vd ranges from 32.0 to 34.0.

15. The optical glass according to claim 1, wherein a content of $Zn^{2+}$ is equal to or greater than 0.1 cation %.

16. The optical glass according to claim 1, wherein the optical glass contains no As.

* * * * *